(12) United States Patent
Kanda et al.

(10) Patent No.: US 12,264,093 B2
(45) Date of Patent: Apr. 1, 2025

(54) ION REMOVAL SYSTEM

(71) Applicant: Panasonic Intellectual Property Management Co., Ltd., Osaka (JP)

(72) Inventors: Takuya Kanda, Kyoto (JP); Ayane Takehisa, Nara (JP); Yasunari Maeda, Osaka (JP); Tomohiro Akita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 559 days.

(21) Appl. No.: 17/629,911

(22) PCT Filed: May 29, 2020

(86) PCT No.: PCT/JP2020/021359
§ 371 (c)(1),
(2) Date: Jan. 25, 2022

(87) PCT Pub. No.: WO2021/019892
PCT Pub. Date: Feb. 4, 2021

(65) Prior Publication Data
US 2022/0298044 A1 Sep. 22, 2022

(30) Foreign Application Priority Data
Jul. 30, 2019 (JP) .................................. 2019-139353

(51) Int. Cl.
*C02F 5/02* (2023.01)
*C02F 1/461* (2023.01)

(52) U.S. Cl.
CPC ............ *C02F 5/02* (2013.01); *C02F 1/46104* (2013.01); *C02F 1/4618* (2013.01);
(Continued)

(58) Field of Classification Search
CPC ...... C02F 5/02; C02F 1/46104; C02F 1/4618; C02F 1/24; C02F 1/38; C02F 2001/46152;
(Continued)

(56) References Cited

U.S. PATENT DOCUMENTS 4,908,109 A * 3/1990 Wright ................ C02F 1/46104
205/744
5,340,458 A * 8/1994 Koizumi ................ C02F 1/4618
204/263
(Continued)

FOREIGN PATENT DOCUMENTS

EP 1991370 A1 11/2008
EP 3056473 A1 8/2016
(Continued)

OTHER PUBLICATIONS

International Search Report for corresponding Application No. PCT/JP2020/021359, mailed Aug. 11, 2020.
(Continued)

*Primary Examiner* — Liam Royce
(74) *Attorney, Agent, or Firm* — Renner, Otto, Boisselle & Sklar, LLP

(57) ABSTRACT

An ion removal system includes: an electrolysis device configured to generate alkaline water and acidic water by electrolysis; a first flow path and a second flow path through which the alkaline water and the acidic water generated by the electrolysis device are alternately allowed to flow; a hard water flow path connected to the electrolysis device to supply the electrolysis device with hard water; and a fine bubble generation device configured to generate fine bubbles in a flow path upstream or downstream of the electrolysis device, wherein a first flow-rate adjustment valve is con-
(Continued)

nected to the first flow path, and a second flow-rate adjustment valve is connected to the second flow path.

14 Claims, 15 Drawing Sheets

(52) U.S. Cl.
CPC .............. *C02F 2001/46152* (2013.01); *C02F 2201/4611* (2013.01); *C02F 2201/46115* (2013.01); *C02F 2303/26* (2013.01)

(58) Field of Classification Search
CPC ...... C02F 2001/5218; C02F 2201/4611; C02F 2201/46115; C02F 2303/26; C02F 9/00; C02F 2209/06; C02F 2209/11; C02F 2209/40; C02F 2209/055; C02F 2303/22; Y02E 60/36
See application file for complete search history.

(56) References Cited

U.S. PATENT DOCUMENTS

| | | | |
|---|---|---|---|
| 5,858,202 A | | 1/1999 | Nakamura |
| 2018/0111093 A1* | | 4/2018 | Griffis .................... B01D 61/50 |
| 2018/0282182 A1 | | 10/2018 | Taketomi et al. |
| 2021/0114908 A1 | | 4/2021 | Takehisa |
| 2021/0221722 A1 | | 7/2021 | Maeda |

FOREIGN PATENT DOCUMENTS

| | | | |
|---|---|---|---|
| EP | 3950601 A1 | | 2/2022 |
| EP | 3950604 A1 | | 2/2022 |
| JP | H7-132291 A | | 5/1995 |
| JP | H9-187770 A | | 7/1997 |
| JP | 2003-236549 A | | 8/2003 |
| JP | 2010-221127 A | | 10/2010 |
| JP | 5059660 B2 | | 10/2012 |
| JP | 2015213569 A | * | 12/2015 |
| JP | 2020-32402 A | | 3/2020 |
| WO | 2007095094 A1 | | 8/2007 |
| WO | 2015052840 A1 | | 4/2015 |
| WO | 2018-159693 A1 | | 9/2018 |
| WO | 2020044695 A1 | | 3/2020 |

OTHER PUBLICATIONS

Extended European Search Report for Corresponding European Application No. 20846726.6 issued Aug. 18, 2022.
International Preliminary Report on Patentability of related International Application No. PCT/JP2020/021359 dated Feb. 1, 2022 (English translation).
First Examination Report for corresponding Indian Application No. 202217004458 issued Apr. 7, 2022.
Office Action for corresponding Japanese Application No. 2021-536630 issued Sep. 27, 2022 and its English translation.
Office Action including Chinese Search Report for corresponding Chinese Application No. 202080054722.9 issued Apr. 1, 2023 and its English translation of Chinese Search Report.
Communication pursuant to Article 94(3) EPC for corresponding European Application No. 20846726.6 dated Dec. 23, 2024.

* cited by examiner (a)          (b)

ION REMOVAL SYSTEM

TECHNICAL FIELD

The present invention relates to an ion removal system.

BACKGROUND ART

Conventional ion removal systems for removing metal ions in hard water have been disclosed (see, for example, Patent Document 1).

The ion removal system of Patent Document 1 includes a hard water storage unit that stores hard water, and a fine bubble generation means configured to generate fine bubbles and supplies the fine bubbles to the hard water storage unit. In the hard water storage unit, metal ions in the hard water are adsorbed to fine bubbles, and metal ions are removed from the hard water.

PRIOR ART DOCUMENTS

Patent Documents

Patent Document 1: WO 2018-159693 A1

SUMMARY OF THE INVENTION

Problems to be Solved by the Invention

Recently, it is required to enhance the effect of removing metal ions by fine bubbles. There is still room for improvement in enhancing the effect of removing metal ions by fine bubbles, including the configuration disclosed in Patent Document 1.

Therefore, an object of the present invention is to solve the above problem, and to provide an ion removal system capable of enhancing the effect of removing metal ions.

Means for Solving the Problems

In order to achieve the above object, an ion removal system of the present invention includes: an electrolysis device configured to generate alkaline water and acidic water by electrolysis; a first flow path and a second flow path through which the alkaline water and the acidic water generated by the electrolysis device are alternately allowed to flow; a hard water flow path connected to the electrolysis device to supply the electrolysis device with hard water; and a fine bubble generation device configured to generate fine bubbles in a flow path upstream or downstream of the electrolysis device, wherein a first flow-rate adjustment valve is connected to the first flow path, and a second flow-rate adjustment valve is connected to the second flow path.

Effects of the Invention

According to an ion removal system of the present invention, an effect of removing metal ions can be enhanced.

MODES FOR CARRYING OUT THE INVENTION

An embodiment according to the present invention will be described in detail with reference to the drawings. The present invention is not limited by the embodiment.

First Embodiment

Figure 1:
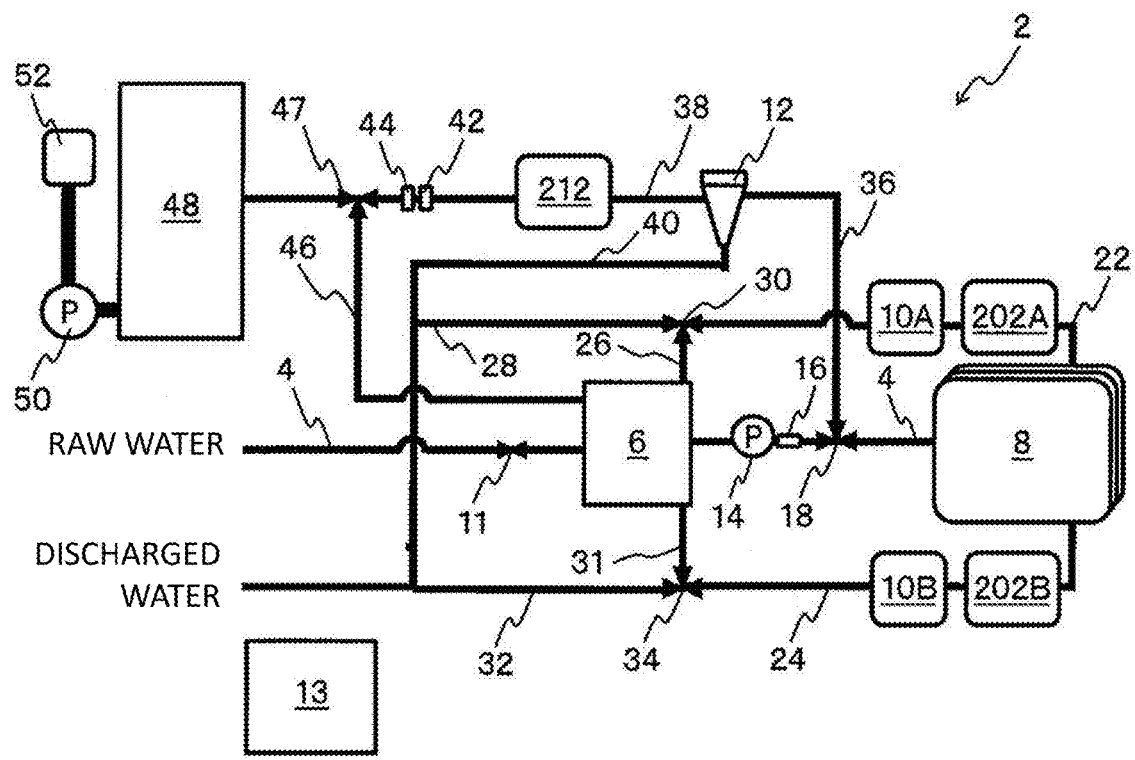
FIG. 1 is a schematic diagram of an ion removal system according to a first embodiment.

FIG. 1 is a schematic diagram of an ion removal system 2 according to a first embodiment.

The ion removal system 2 is a system for removing metal ions from hard water using fine bubbles. The metal ions here are calcium ions ($Ca^{2+}$) and magnesium ions ($Mg^{2+}$). The ion removal system 2 in the first embodiment is a water softening device that removes and separates metal ions from hard water to reduce the concentration of metal ions in hard water (hardness) to a predetermined concentration or less, thereby producing soft water. As the definition of hard water and soft water, for example, the WHO definition may be used. That is, water of a hardness of less than 120 mg/L may be defined as soft water, and water of a hardness of 120 mg/L or more may be defined as hard water.

The fine bubbles in the first embodiment are bubbles having a diameter of 100 μm or less. The fine bubbles include microbubbles (having a diameter of, for example, 1 μm or more and 100 μm or less) and nanobubbles (having a diameter of, for example, less than 1 μm). The microbubble may be a bubble having a diameter that can be recognized as a microorder bubble diameter by a person skilled in the art of water treatment. The nanobubble may be a bubble having a diameter that can be recognized as a nano-order bubble diameter by a person skilled in the art of water treatment. The fine bubbles have properties different from those of ordinary bubbles, such as a long residence time in water, difficulty in increasing the diameter of the bubble as a single substance and difficulty in coalescing with other bubbles, and a large contact area and easy chemical reaction.

The fine bubbles may include bubbles (such as millibubbles) having a diameter of 100 μm or more at a small ratio. For example, bubbles including bubbles having a diameter of 100 μm or less at a ratio of 90% or more may be defined as the fine bubbles. In addition to this, a condition that the ratio of bubbles having the diameter of 60 μm or less is 50% or more and the ratio of bubbles having the diameter of 20 μm or less is 5% or more may be added for the definition. When the diameter (bubble diameter) of the bubble is measured, for example, hard water containing fine bubbles may be directly imaged by a high-speed camera, and the bubble diameter may be calculated by a three-point method by image processing, or the bubble diameter may be measured by any other method. The bubble diameter may be measured at any timing as long as the fine bubbles are retained. An example of the conditions of the measurement method using the high-speed camera described above is as follows.

High-speed camera: FASTCAM 1024 PCI (PHOTRON LIMITED)
Lens system: Z16 APO (Leica)
Objective lens: Planapo 2.0× (Leica)
Imaging speed: 1000 fps
Shutter speed: 1/505000 sec
Image area: 1024×1024 pixels (microbubble imaging region 1.42 mm×1.42 mm, millibubble imaging region 5.69 mm×5.69 mm)
Image processing software: Image-Pro Plus (Media Cybermetrics)

The ion removal system 2 illustrated in FIG. 1 includes a hard water flow path 4, a batch treatment tank 6, an electrolysis device 8, fine bubble generation devices 10A and 10B, a separation device 12, and a controller 13.

The hard water flow path 4 is a flow path for supplying hard water to the electrolysis device 8. The hard water flow path 4 is connected to a water source of hard water (not illustrated). The hard water flow path 4 of the first embodiment is connected to the electrolysis device 8 so as to supply hard water to the electrolysis device 8 via the batch treatment tank 6.

In the middle of the hard water flow path 4, in addition to the batch treatment tank 6, a valve 11, a pump 14, a flow-rate sensor 16, and a valve 18 are provided.

The batch treatment tank 6 is a tank provided in the middle of the hard water flow path 4. The batch treatment tank 6 stores hard water supplied from the hard water flow path 4. By providing the batch treatment tank 6, batch treatment can be performed.

The valve 11 is a valve that controls water flow from the hard water flow path 4 to the batch treatment tank 6 (an electromagnetic valve in the first embodiment). The pump 14 is a pump for supplying hard water stored in the batch treatment tank 6 to the electrolysis device 8. The flow-rate sensor 16 is a sensor that measures the flow-rate of hard water supplied from the batch treatment tank 6 to the electrolysis device 8.

The electrolysis device 8 is a device configured to generate alkaline water and acid water by electrolyzing hard water supplied from the hard water flow path 4. The detailed configuration of the electrolysis device 8 will be described later. A first flow path 22 and a second flow path 24 are connected to the electrolysis device 8 as two flow paths.

The first flow path 22 and the second flow path 24 are flow paths through which alkaline water and acid water generated by the electrolysis device 8 can alternately flow. When alkaline water is allowed to flow through the first flow path 22, acid water is allowed to flow through the second flow path 24, and when acid water is allowed to flow through the first flow path 22, alkaline water is allowed to flow through the second flow path 24.

The fine bubble generation device 10A and a debubbling device 202A are provided in the middle of the first flow path 22. Similarly, the fine bubble generation device 10B and a debubbling device 202B are provided in the middle of the second flow path 24.

The fine bubble generation devices 10A and 10B are devices that generate and supply fine bubbles to the first flow path 22 and the second flow path 24, respectively. By supplying the fine bubbles to each flow path, metal ions contained in water flowing through the flow path can be adsorbed to the fine bubbles and removed from the water. The fine bubble generation devices 10A and 10B of the first embodiment are devices that generate fine bubbles by cavitation action. The fine bubble generation devices 10A and 10B automatically supply fine bubbles to water flowing through the fine bubble generation devices 10A and 10B.

The debubbling devices 202A and 202B are devices for discharging bubbles contained in water flowing through the first flow path 22 and the second flow path 24 to the outside, respectively. The debubbling devices 202A and 202B of the first embodiment perform centrifugal separation on water flowing through the first flow path 22 and the second flow path 24, respectively, to discharge bubbles to the outside. By discharging the bubbles by the debubbling devices 202A and 202B, the amount of bubbles contained in the water sent to the fine bubble generation devices 10A and 10B can be reduced.

When the electrolysis device 8 is operated, alkaline water and acid water are generated, and bubbles such as $H_2$ and $O_2$ are generated at the same time. When such water containing many bubbles is sent to the fine bubble generation devices 10A and 10B, the effect of bubble contraction by the fine bubbles described later is hindered, and as a result, crystallization of metal ions may be hindered. On the other hand, by providing the debubbling devices 202A and 202B and discharging the bubbles in the first flow path 22 and the second flow path 24, the crystallization of metal ions by the fine bubbles can be promoted.

A first return flow path 26 and a first discharge flow path 28 are connected to the first flow path 22. The first return flow path 26 is a flow path connected from the first flow path 22 to the batch treatment tank 6. The first discharge flow path 28 is a flow path extending from the first flow path 22 to the outside of the system of the ion removal system 2 without flowing through the batch treatment tank 6.

A valve 30 is provided at a position where the first return flow path 26 and the first discharge flow path 28 are connected to the first flow path 22. The valve 30 is a valve for switching to allow a flow of water from the first flow path 22 to the first return flow path 26 or the first discharge flow path 28 (an electric valve in the first embodiment).

A second return flow path 31 and a second discharge flow path 32 are connected to the second flow path 24. The second return flow path 31 is a flow path connected from the second flow path 24 to the batch treatment tank 6. The second discharge flow path 32 is a flow path extending from the second flow path 24 to the outside of the system of the ion removal system 2 without flowing through the batch treatment tank 6.

A valve 34 is provided at a position where the second return flow path 31 and the second discharge flow path 32 are connected to the second flow path 24. The valve 34 is a valve for switching to allow a flow of water from the second flow path 24 to the second return flow path 31 or the second discharge flow path 32 (an electric valve in the first embodiment).

The connection point at which the first return flow path 26 and the second return flow path 31 described above are connected to the hard water flow path 4 corresponds to the batch treatment tank 6 in the first embodiment. A branch flow path 36 is connected to the hard water flow path 4 on the side downstream of the batch treatment tank 6 corresponding to the connection point. The branch flow path 36 is a flow path branched from the hard water flow path 4 between the batch treatment tank 6 and the electrolysis device 8.

The valve 18 described above is provided at a position where the branch flow path 36 is connected to the hard water flow path 4. The valve 18 is a valve for switching between allowing and stopping a flow of water from the hard water flow path 4 to the branch flow path 36 (an electric valve in the first embodiment).

The separation device 12 is connected to the branch flow path 36. The separation device 12 is a device that separates crystals of a metal component from water. The separation device 12 of the first embodiment is a cyclone-type separation device that separates solids such as crystals contained in water by centrifugal separation.

A third flow path 38 and a third discharge flow path 40 are connected to the separation device 12 as two flow paths. The third flow path 38 is a flow path through which the treated water from which the crystals have been separated by the separation device 12 flows. The discharge flow path 40 is a flow path through which discharge water containing crystals separated by the separation device 12 flows. The discharge flow path 40 extends to the outside of the system of the ion removal system 2 without flowing through the batch treatment tank 6 together with the first discharge flow path 28 and the second discharge flow path 32 described above.

A pH sensor 42, a turbidity sensor 44, and a carbon dioxide input device 212 are provided in the middle of the third flow path 38. The pH sensor 42 and the turbidity sensor 44 are sensors that measure the pH value and the turbidity, respectively, of the treated water that is allowed to flow through the third flow path 38. The carbon dioxide input device 212 is a device that inputs carbon dioxide into the treated water that is allowed to flow through the third flow path 38.

A third return flow path 46 is further connected to the middle of the third flow path 38. The third return flow path 46 is a flow path connected between the third flow path 38 and the batch treatment tank 6.

A valve 47 is provided at a position where the third return flow path 46 is connected to the third flow path 38. The valve 47 is a valve for switching between allowing and stopping a flow of water from the third flow path 38 to the third return flow path 46 (an electric valve in the first embodiment).

A water storage tank 48 is further connected to the third flow path 38. The water storage tank 48 is a tank that stores the treated water supplied from third flow path 38. The treated water stored in the water storage tank 48 is supplied to a water faucet 52 by a pump 50. The water faucet 52 is a treated water supply point where treated water is supplied to the user. By driving the pump 50, the treated water (that is, soft water) obtained by treating hard water by the ion removal system 2 can be supplied to the water faucet 52 and used.

The controller 13 is a member that controls each component of the ion removal system 2 described above. The controller 13 performs opening and closing control of each valve, ON/OFF control of each pump, ON/OFF control of the electrolysis device 8, ON/OFF control of the separation device 12, and the like. The controller 13 is, for example, a microcomputer.

The control device 13 operates the ion removal system 2 in a plurality of operation modes. These operation modes will be described.

(Raw Water Injection Mode)

Figure 2A:
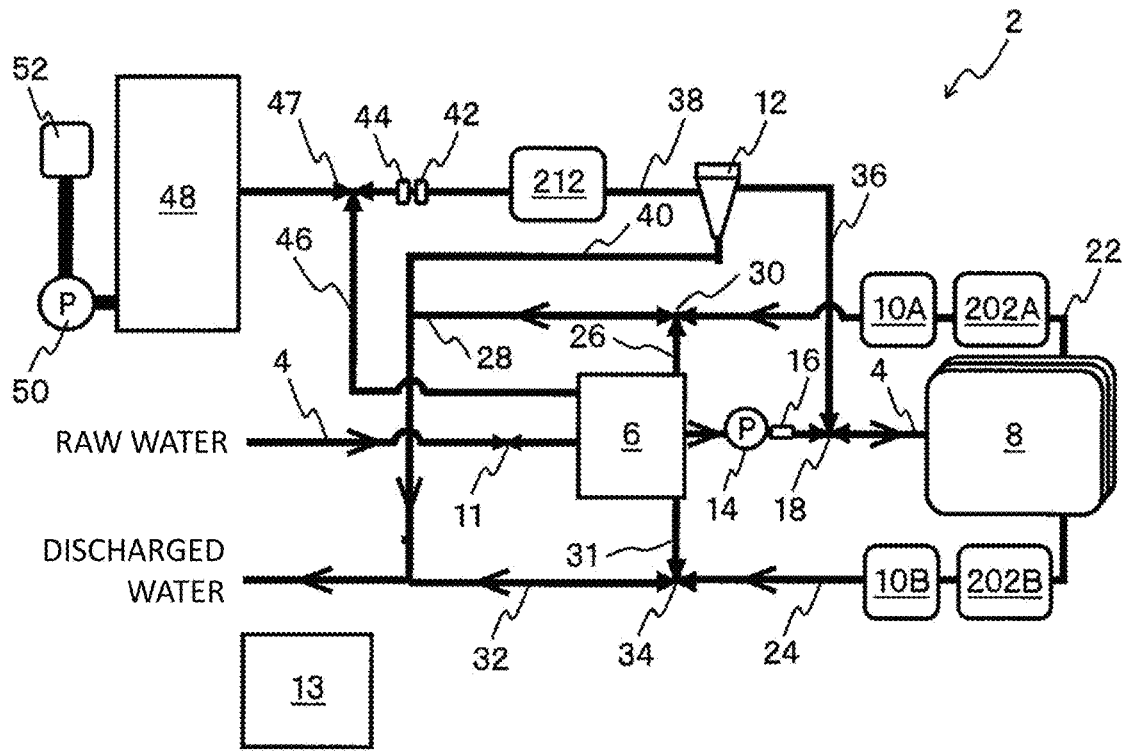
FIG. 2A is a diagram illustrating a flow of water in a first stage of a raw water injection mode in the first embodiment.
Figure 2B:
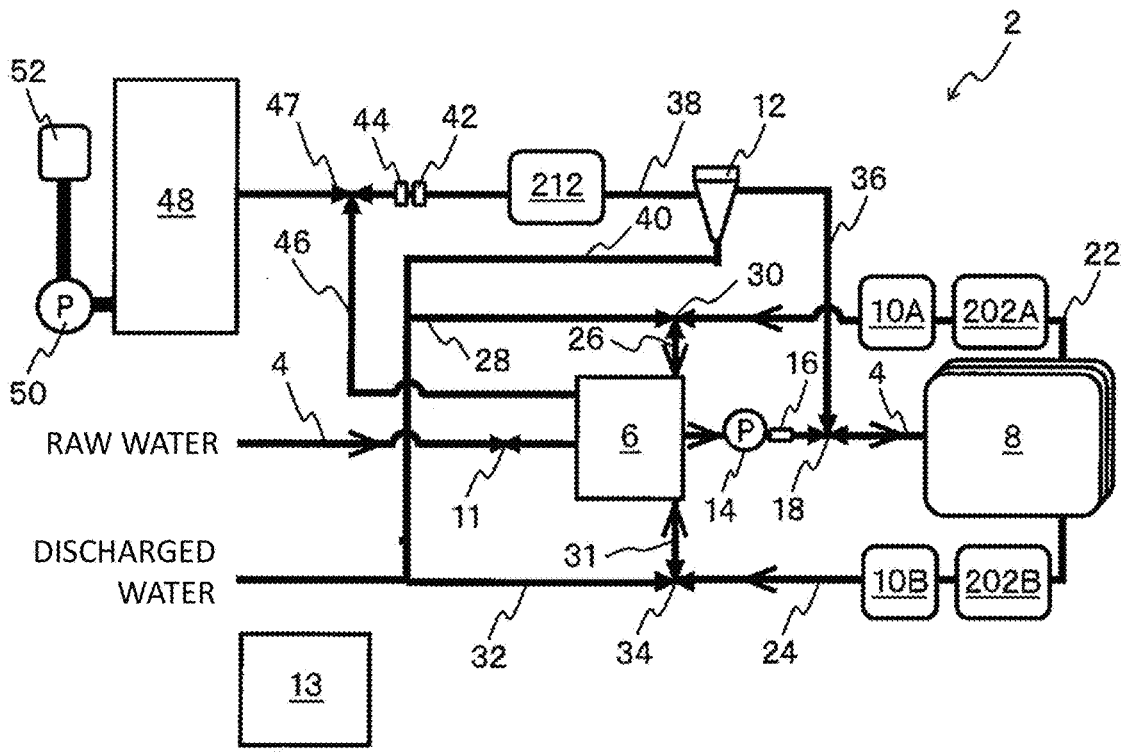
FIG. 2B is a diagram illustrating a flow of water in a second stage of the raw water injection mode in the first embodiment.

A raw water injection mode is a mode in which hard water as raw water is injected into each flow path when the operation of the ion removal system 2 is started. Specifically, the control device 13 performs control to generate a flow as illustrated in FIGS. 2A and 2B. In FIGS. 2A and 2B and subsequent drawings, the flow of water is represented by an arrow, and it is assumed that no flow of water occurs in a flow path without an arrow.

FIG. 2A illustrates a mode for discharging residual water remaining in the flow path as a first stage of the raw water injection mode. As illustrated in FIG. 2A, the controller 13 opens the valve 11 so as to flow hard water through the hard water flow path 4, and drives the pump 14 so as to supply the hard water in the batch treatment tank 6 to the electrolysis device 8. At this time, the controller 13 acquires the flow-rate of hard water flowing from the batch treatment tank 6 to the electrolysis device 8 on the basis of a detection result of the flow-rate sensor 16. The controller 13 further controls of the valve 18 so as to stop water from flowing from the hard water flow path 4 to the branch flow path 36 and prevent hard water from flowing. The controller 13 further performs control so that hard water allowed to flow through the hard water flow path 4 is allowed to directly flow through the first flow path 22 and the second flow path 24 without operating the electrolysis device 8. The controller 13 further controls of the valve 30 such that hard water that has been allowed to flow through the first flow path 22 is allowed to flow through the first discharge flow path 28, and controls of the valve 34 such that hard water that has been allowed to flow through the second flow path 24 is allowed to flow through the second discharge flow path 32. As a result, a flow of arrows as illustrated in FIG. 2A is generated, and residual water remaining in each flow path is discharged.

FIG. 2B illustrates a mode for injecting new hard water into the batch treatment tank 6 as a second stage of the raw water injection mode. The controller 13 changes the opening and closing of the valves 30, 34 from the state illustrated in FIG. 2A. Specifically, opening and closing of the valve 30 is controlled such that hard water allowed to flow through the first flow path 22 is allowed to flow through the first return flow path 26, and opening and closing of the valve 34 is controlled such that hard water allowed to flow through the second flow path 24 is allowed to flow through the second return flow path 31. As a result, a flow of arrows as illustrated in FIG. 2B is generated, and new hard water is injected into the batch treatment tank 6.

After the raw water injection mode described above is performed, a first crystallization treatment mode or a second crystallization treatment mode described below is performed.

(First Crystallization Treatment Mode (First Mode))

Figure 3A:
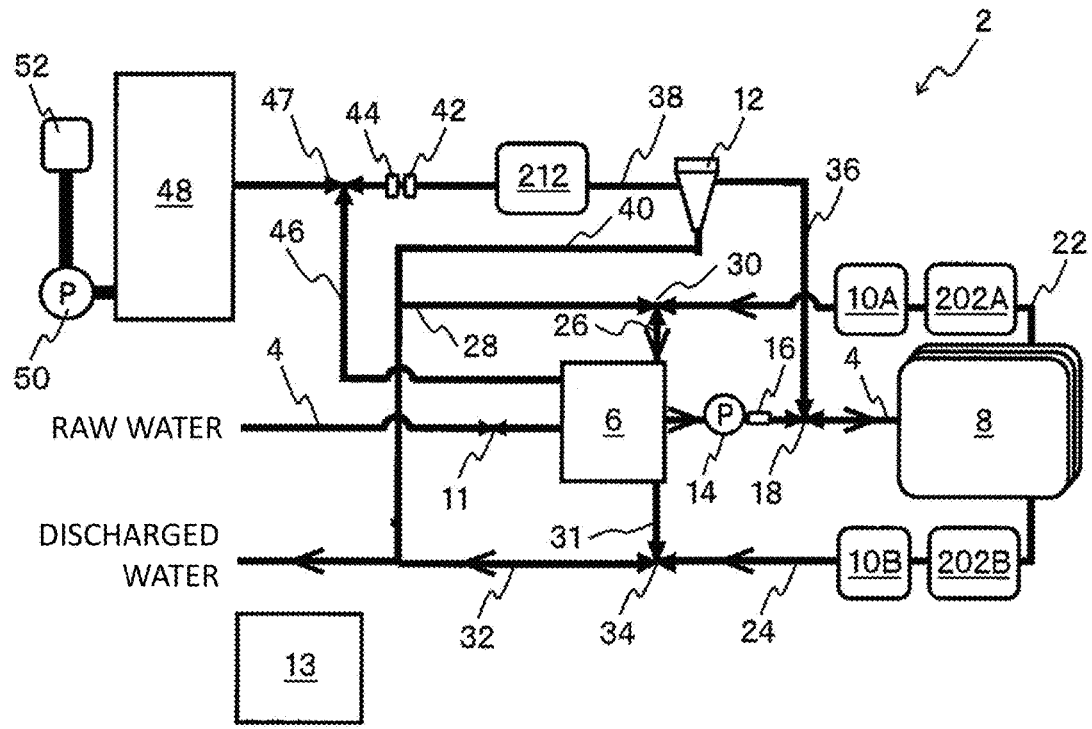
FIG. 3A is a diagram illustrating a flow of water in a first crystallization treatment mode in the first embodiment.

FIG. 3A illustrates a first crystallization treatment mode. The controller 13 closes the valve 11 and drives the pump 14 so as to supply the hard water stored in the batch treatment tank 6 to the electrolysis device 8. The controller 13 controls the valve 18 so that water is not allowed to flow from the hard water flow path 4 to the branch flow path 36. The controller 13 further drives the electrolysis device 8 to generate alkaline water and acid water. Specifically, the electrolysis device 8 electrolyzes hard water supplied from the batch treatment tank 6 to generate alkaline water and acid water.

Among the alkaline water and the acid water generated by the electrolysis device 8, in the first crystallization treatment mode, the controller 13 controls the electrolysis device 8 so that the alkaline water is allowed to flow through the first flow path 22 and the acid water is allowed to flow through the second flow path 24.

The controller 13 further controls the valve 30 such that alkaline water that has been allowed to flow through the first flow path 22 is allowed to flow through the first return flow path 26, and controls the valve 34 such that acid water that has been allowed to flow through the second flow path 24 is allowed to flow through the second discharge flow path 32. As a result, a flow of arrows as illustrated in FIG. 3A is generated.

In the flow illustrated in FIG. 3A, a circulation flow path is formed through which alkaline water flows in a loop in the order of the batch treatment tank 6, the electrolysis device 8, the first flow path 22, and the first return flow path 26. The first flow path 22 functions as a return flow path together with the first return flow path 26. In the circulation flow path, fine bubbles are supplied from the fine bubble generation device 10A to the alkaline water flowing through the first flow path 22. By supplying the fine bubbles, metal ions contained in the alkaline water are adsorbed by the fine bubbles and removed from the alkaline water. The principle of removal of metal ions by the fine bubbles will be described later.

The hard water subjected to the metal ion removal treatment becomes "treated water" and is stored in the batch treatment tank 6. Thereafter, the treated water is sucked by the pump 14 and sent to the electrolysis device 8, and fine bubbles are supplied again by the fine bubble generation device 10A. As the treated water flows through the circulation flow path, fine bubbles are continuously supplied to the treated water, and the metal ion removal treatment is continuously performed.

By circulating alkaline water in the circulation flow path, metal ions are continuously removed by fine bubbles while increasing the pH value of water flowing through the circulation flow path. By increasing the pH value, $OH^-$ having a negative charge present on the surface of the fine bubble is increased, and $Ca^{2+}$ is easily adsorbed to the fine bubble. As a result, as described later, the crystallization of metal ions can be promoted, and the effect of removing metal ions can be enhanced. By circulating alkaline water containing crystals of a metal component, metal ions contained in water can be crystallized in a form of adhering to the crystals, and the crystallization of the metal ions can be further promoted.

(Second Crystallization Treatment Mode (Second Mode))

Figure 3B:
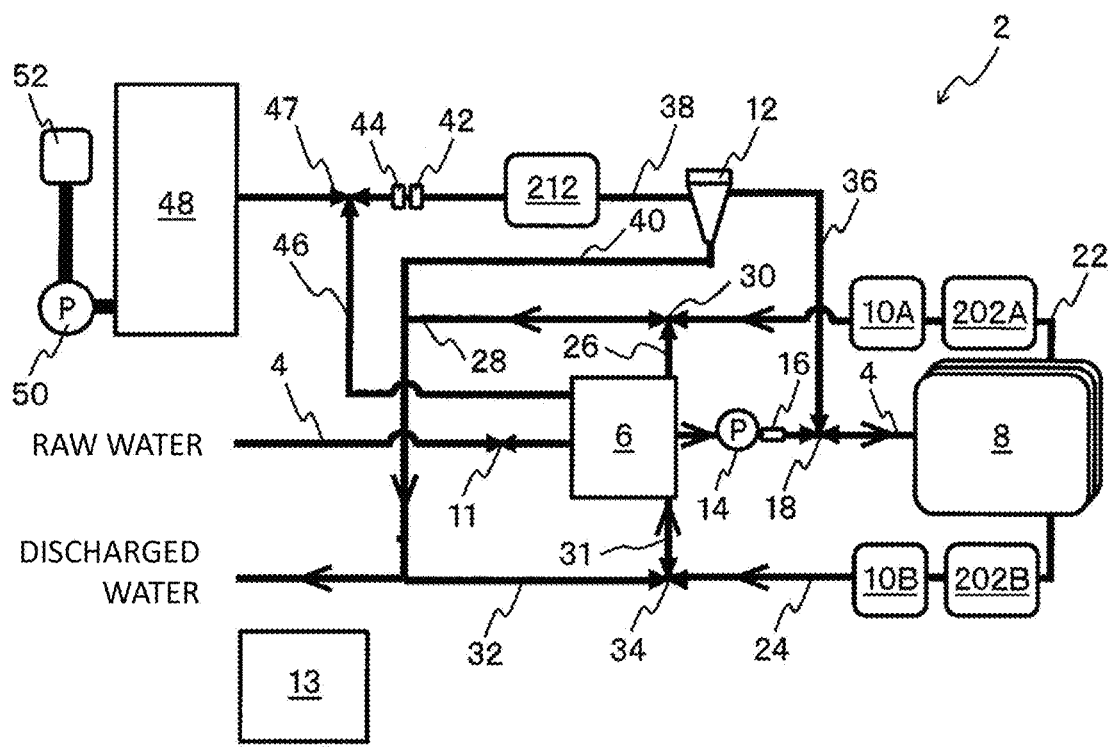
FIG. 3B is a diagram illustrating a flow of water in a second crystallization treatment mode in the first embodiment.

FIG. 3B illustrates a second crystallization treatment mode. In the second crystallization treatment mode, unlike the first crystallization treatment mode illustrated in FIG. 3A, the controller 13 controls the electrolysis device 8 so that, among the alkaline water and the acid water generated by the electrolysis device 8, the acid water is allowed to flow through the first flow path 22 and the alkaline water is allowed to flow through the second flow path 24. The controller 13 further controls the valve 30 such that acid water that has been allowed to flow through first flow path 22 is allowed to flow through the first discharge flow path 28, and controls the valve 34 such that alkaline water that has been allowed to flow through the second flow path 24 is allowed to flow through the second return flow path 31. As a result, a flow of arrows as illustrated in FIG. 3B is generated.

In the flow illustrated in FIG. 3B, a circulation flow path through which alkaline water flows in a loop in the order of the batch treatment tank 6, the electrolysis device 8, the second flow path 24, and the second return flow path 31 is formed. The second flow path 24 functions as a return flow path together with the second return flow path 31. In the circulation flow path, fine bubbles are supplied from the fine bubble generation device 10B to the alkaline water allowed to flow through the second flow path 24. By supplying the fine bubbles, metal ions contained in the alkaline water are adsorbed by the fine bubbles and removed from the alkaline water.

As similar to the first crystallization treatment mode, by circulating alkaline water in the circulation flow path, metal ions can be continuously removed by the fine bubbles while increasing the pH value of water flowing through the circulation flow path. As a result, the same effect as that of the first crystallization treatment mode can be achieved.

After the first crystallization treatment mode or the second crystallization treatment mode described above performed, a treated water supply mode described below is performed.

(Treated Water Supply Mode (Third Mode))

Figure 4:
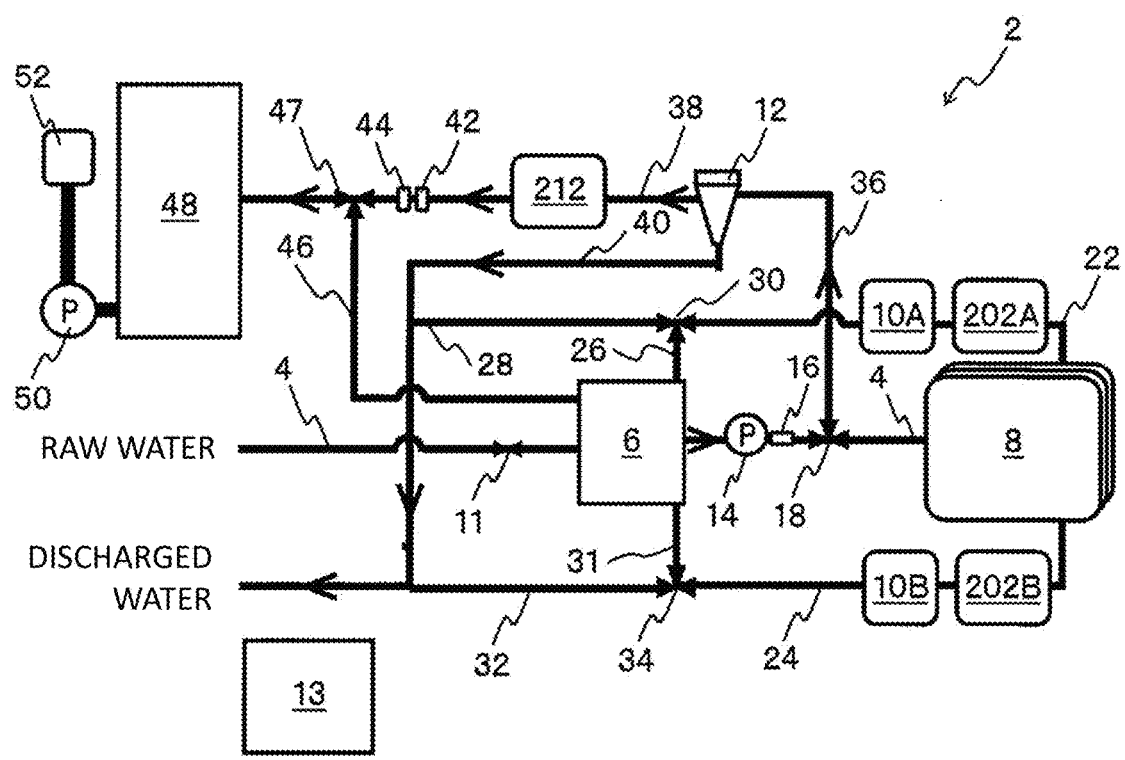
FIG. 4 is a diagram illustrating a flow of water in a treated water supply mode in the first embodiment.

FIG. 4 illustrates a treated water supply mode. The treated water supply mode is an operation mode in which treated water obtained by treating hard water in the first crystallization treatment mode and the second crystallization treatment mode is supplied to the water faucet 52.

First, the controller 13 controls of the valve 18 so that water is allowed to flow into the branch flow path 36. By driving the pump 14 in this state, the treated water stored in the batch treatment tank 6 is allowed to flow through the branch flow path 36. At this time, the controller 13 controls of the valve 18 so that water is not allowed to flow through the electrolysis device 8.

The treated water that has been allowed to flow through the branch flow path 36 is sent to the separation device 12. The separation device 12 separates crystals of a metal component contained in the treated water. The separation device 12 further supplies the treated water from which the crystals have been separated to the third flow path 38, and allows the discharge water containing the crystals to flow through the third discharge flow path 40.

The treated water that has allowed to flow through the third flow path 38 is stored in water storage tank 48. Thereafter, by operating the pump 50, the treated water (that is, soft water) stored in the water storage tank 48 is supplied to the water faucet 52, and the treated water becomes available at the water faucet 52.

The controller 13 alternately performs control of sequentially performing the raw water injection mode, the first crystallization treatment mode, and the treated water supply mode described above, and control of sequentially performing the raw water injection mode, the second crystallization treatment mode, and the treated water supply mode. In both the first crystallization mode and the second crystallization mode, a circulation flow path is formed in a flow path including the batch treatment tank 6, the electrolysis device 8, and the return flow paths 26, 31, and acid water is discharged to the outside of the system of the ion removal system 2 while circulating alkaline water in the circulation flow path. By alternately performing the first crystallization treatment mode and the second crystallization treatment mode, the flow path through which the alkaline water has flowed can be cleaned with the acid water, and the flow path in the ion removal system 2 can be maintained in a state suitable for the metal ion removal treatment. As a result, the effect of removing metal ions by the fine bubbles can be enhanced.

<Water Softening Treatment (Removal Treatment of Metal Ions)>

The principle of the metal ion removal treatment using the above-described fine bubbles, that is, the "water softening treatment" will be described in more detail.

It is presumed that when the fine bubbles containing air are supplied into hard water, an action as described in the following sections (1) and (2) occurs on metal ions in hard water. Specifically, it is presumed that the metal ions in hard water can be adsorbed to the fine bubbles, and the adsorbed metal ions can be crystallized to remove the crystals of the metal component from hard water. More specifically, it is as follows. Note that the present invention is not limited to the specific principle described in the following sections (1) and (2).

(1) Adsorption of Metal Ions

Figure 5:
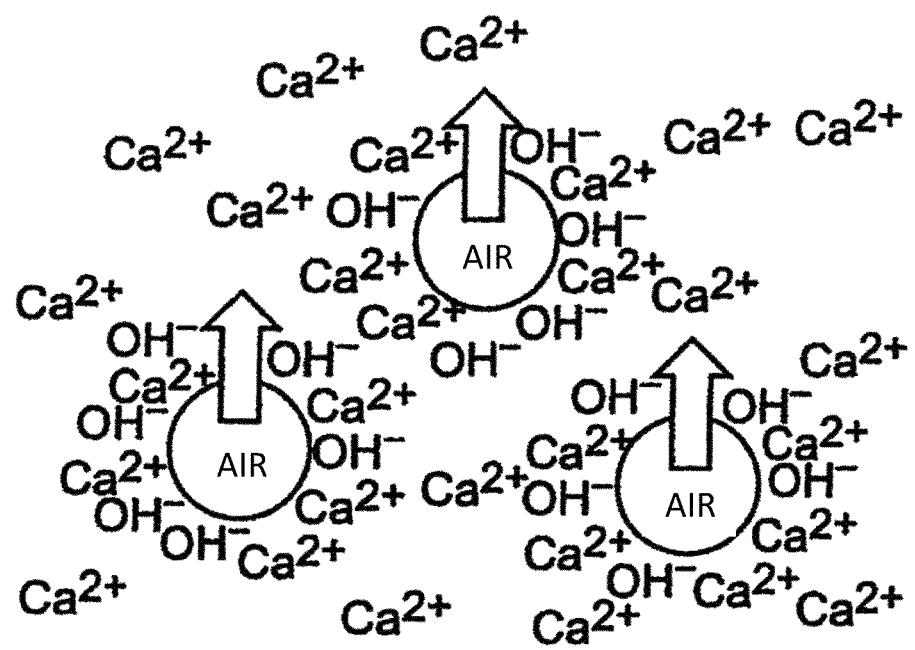
FIG. 5 is a schematic diagram for explaining a hypothetical principle of adsorption of metal ions by the ion removal device.

As illustrated in FIG. 5, when fine bubbles containing air are supplied into hard water, $H^+$ (hydrogen ions) and $OH^-$ (hydroxide ions) are mixed on the surfaces of the fine bubbles, $H^+$ is positively charged, and $OH^-$ is negatively charged (only $OH^-$ is illustrated in FIG. 5). On the other hand, in hard water, $Ca^{2+}$ and $Mg^{2+}$ exist as positively charged metal ions. In the following description, $Ca^{2+}$ will be described as an example of the metal ion.

The positively charged $Ca^{2+}$ is adsorbed to $OH^-$ present on the surface of the fine bubble by the action of intermolecular force (interionic interaction). As described above, $Ca^{2+}$ can be adsorbed to the fine bubbles. Although $H^+$ repelling $Ca^{2+}$ exists on the surface of the fine bubble, it is considered that $OH^-$ acts preferentially to $H^+$ to adsorb $Ca^{2+}$.

(2) Crystallization of Metal Ions

Figure 6:
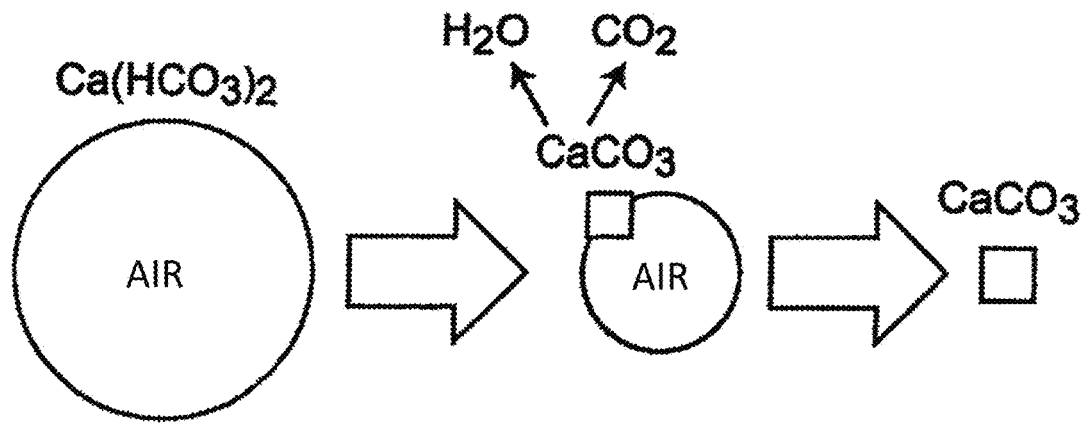
FIG. 6 is a schematic diagram for explaining a hypothetical principle of crystallization of metal ions by the ion removal device.

In addition to the reaction illustrated in FIG. 5, the reaction illustrated in FIG. 6 is promoted by supplying fine bubbles containing air into hard water. Specifically, the fine bubbles supplied into hard water are difficult to float unlike normal bubbles, and dissolve into hard water, so that the surface tension increases and gradually contracts as illustrated in FIG. 6. As described above, $Ca^{2+}$ is adsorbed on the surface of the fine bubble. More specifically, it is present as a calcium ion of soluble $Ca(HCO_3)_2$ (calcium hydrogen carbonate). As the fine bubble gradually contracts, the dissolved concentration of $Ca^{2+}$ on the surface of the fine bubble increases. An increase in the dissolution concentration causes supersaturation at a certain time point, and $Ca^{2+}$ is crystallized and precipitated. A specific chemical formula for this is as the following Formula 1.

$$Ca(HCO_3)_2 \rightarrow CaCO_3 + CO_2 + H_2O \quad \text{(Formula 1)}$$

$CaCO_3$ (calcium carbonate) is insoluble (water-insoluble) and, thus, precipitates as crystals of a metal component. As a result, part of $Ca(HCO_3)_2$ dissolved as $Ca^{2+}$ is precipitated as crystals of the metal component. By promoting such a reaction, it is possible to separate $CaCO_3$ precipitated by crystallizing the metal ion $Ca^{2+}$ from hard water.

Although a reaction in a direction opposite to Formula 1 may occur in the same water, it is presumed that the reaction in the direction of Formula 1 is preferentially performed in the equilibrium relationship by continuously supplying the fine bubbles. Since the reaction in the opposite direction of Formula 1 is basically a reaction that does not occur unless $CO_2$ gas is blown from the outside, it is considered that the reaction in the direction of Formula 1 preferentially occurs.

In the first embodiment, air is used as the gas of the fine bubbles in the water softening treatment, but the present invention is not limited to such a case. As the gas of the fine bubbles, for example, nitrogen may be used instead of air. It is presumed that by generating nitrogen fine bubbles from the fine bubble generation devices 10A and 10B and supplying the nitrogen fine bubbles into hard water, in addition to the effects of "(1) Adsorption of metal ions" and "(2) Crystallization of metal ions" described above, the effects as described in the following sections (3) and (4) are promoted. Note that the present invention is not limited to the specific principle described in the following sections (3) and (4).

(3) Promotion of Metal Ion Adsorption

Figure 7:
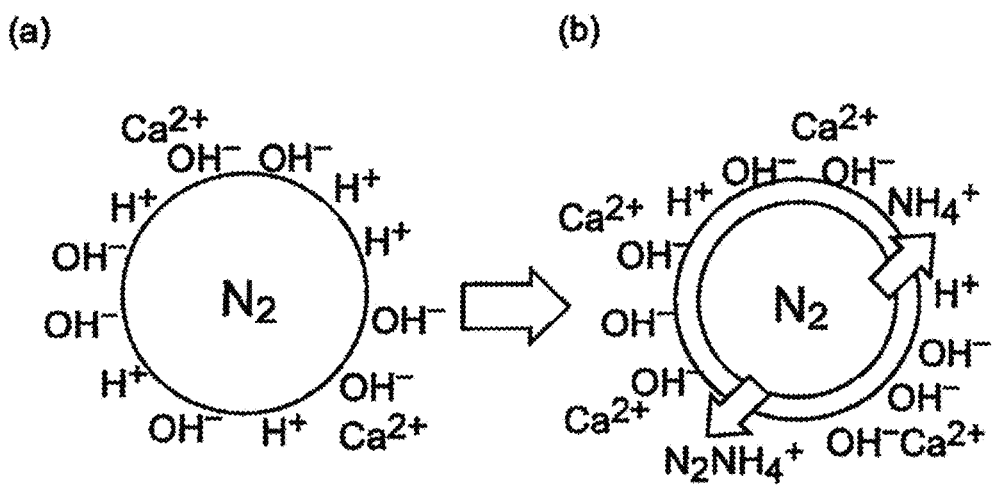
FIG. 7 is a schematic diagram for explaining a hypothetical principle of adsorption of metal ions by an ion removal device.

As illustrated in FIG. 7(a), $H^+$ and $OH^-$ are charged around the fine bubbles. As described above, positively charged $Ca^{2+}$ is adsorbed to negatively charged $OH^-$. Under such circumstances, when nitrogen is used as the fine bubbles, the reaction of the following Formula 2 is promoted.

$$N_2 + 6H^+ + 6e^- \rightarrow 2NH_3$$

$$NH_3 + H_2O \rightarrow NH_4^+ + OH^- \quad \text{(Formula 2)}$$

As the reaction of Formula 2 is promoted, the number of $H^+$ ions decreases with respect to the number of $OH^-$ ions as illustrated in FIG. 7(b). As a result, a negative charge becomes strong as fine bubbles, and $Ca^{2+}$ having a positive charge is easily adsorbed.

In the case of using nitrogen as in the present modification, the reaction of Formula 2 can be promoted as compared with the case of using air, so that the adsorption of metal ions is further promoted. This makes it possible to separate and remove more metal ions from hard water.

The above principle is not limited to nitrogen, and it is presumed that the same applies to a gas that reacts with $H^+$ ions and can reduce the number of $H^+$ ions with respect to the number of $OH^-$ ions.

(4) Enhancement of Metal Ion Crystallization

Since nitrogen is an inert gas different from air, when nitrogen is supplied into hard water, the balance of partial pressures of gases contained in hard water is lost. As a result, the reaction as illustrated in FIG. 8 is promoted.

Figure 8:
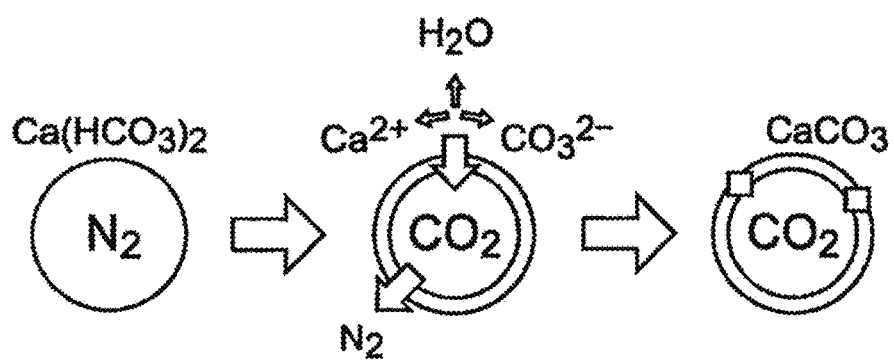
FIG. 8 is a schematic diagram for explaining a hypothetical principle of crystallization of metal ions by the ion removal device.

As illustrated in FIG. 8, other gas components dissolved in hard water act to replace the fine bubbles composed of nitrogen. In the example illustrated in FIG. 8, $CO_2$ is contained in $Ca(HCO_3)_2$ existing around the fine bubbles, and this $CO_2$ is extracted and acts to replace nitrogen. That is, the following reaction is promoted.

$$Ca(HCO_3)_2 \rightarrow CaCO_3 + CO_2 + H_2O \quad \text{(Formula 3)}$$

A reaction in which insoluble $CaCO_3$ is generated from soluble $Ca(HCO_3)_2$ occurs as described above. At this time, $CO_2$ and $H_2O$ are generated. Since $CaCO_3$ is insoluble, it precipitates as a crystal of a metal component.

By the reaction, metal ions of $Ca(HCO_3)_2$ contained as $Ca^{2+}$ in hard water can be crystallized and precipitated. As a result, the crystal of the metal component can be removed from hard water.

The above principle is not limited to nitrogen, and it is presumed that the same applies to a gas other than air that unbalances the partial pressure of a gas dissolved in hard water.

As described above, by introducing nitrogen to generate fine bubbles and supplying the bubbles to hard water, the reactions described in the sections of "(3) Promotion of metal ion adsorption" and "(4) Enhancement of metal ion crystallization" can be promoted, as compared with the case of using air. This makes it possible to improve the accuracy of removing metal ions from hard water.

Although, in the above description, $Ca^{2+}$ has been described as an example of the metal ion, it is presumed that a similar reaction also occurs for $Mg^{2+}$.

(Abnormality Occurrence Mode)

The controller 13 can perform an abnormality-occurrence mode described below as modes different from the plurality of modes described above.

In the treated water supply mode illustrated in FIG. 4, the measurement values of the pH sensor 42 and the turbidity sensor 44 may be detected as abnormal values with respect to the treated water flowing from the third flow path 38 to the water storage tank 48. In such a case, the abnormality occurrence mode described below is performed in order to stop the flow of the treated water to the water storage tank 48.

Figure 9:
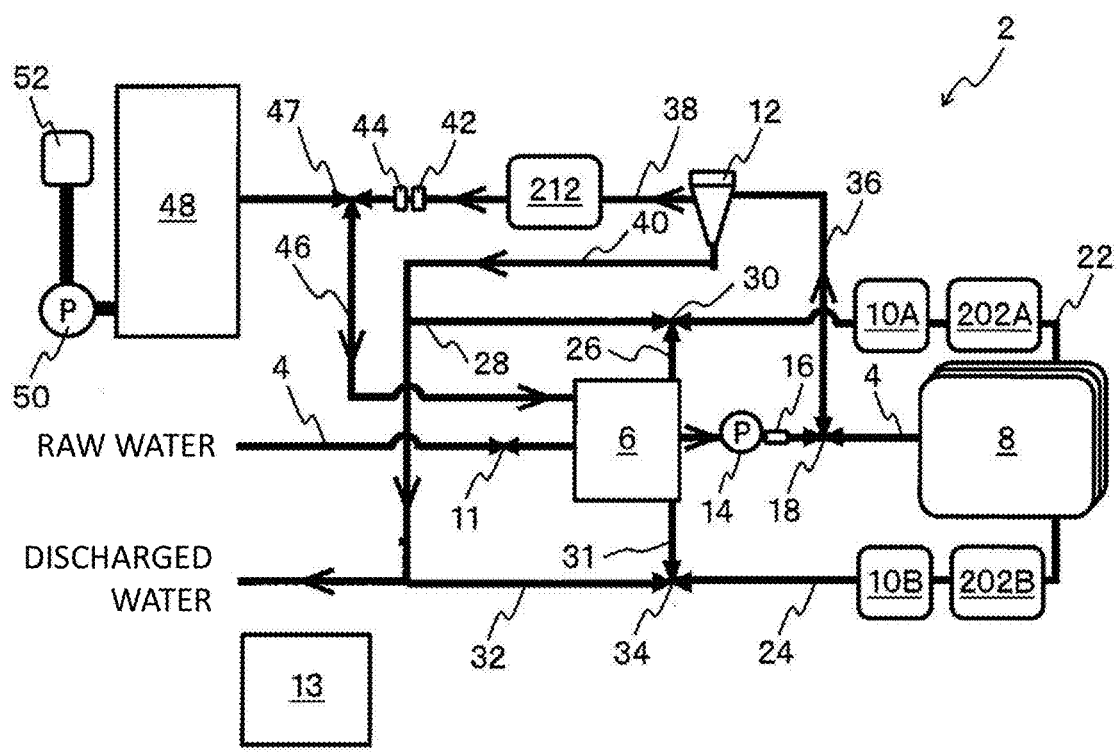
FIG. 9 is a diagram illustrating a flow of water in an abnormality occurrence mode in the first embodiment.

FIG. 9 illustrates the abnormality occurrence mode. The controller 13 changes the opening and closing control of the valve 47 from the treated water supply mode illustrated in FIG. 4. Specifically, opening and closing of the valve 47 is controlled from the state where a flow of water is allowed from the third flow path 38 to the water storage tank 48, to the state where a flow of water is stopped in a flow path from the third flow path 38 to the water storage tank 48 and a flow of water is allowed to the third return flow path 46. As a result, a flow of arrows as illustrated in FIG. 9 is generated.

By stopping the flow of water from the third flow path 38 to the water storage tank 48, it is possible to stop the supply of the treated water in which the abnormal value of the pH value or the turbidity is detected.

In the abnormality occurrence mode illustrated in FIG. 9, the circulation flow path is configured as a series of flow paths including the third return flow path 46. Specifically, a circulation flow path is configured in which the treated water flows through the third return flow path 46, the batch treatment tank 6, the hard water flow path 4, the branch flow path 36, the separation device 12, and the third flow path 38 in this order.

In the circulation flow path, carbon dioxide is input by the carbon dioxide input device 212. By inputting carbon dioxide into the treated water, the carbon dioxide is dissolved in the treated water, and the acidity of the treated water increases. As a result, the pH of the treated water in the circulation flow path can be reduced. The carbon dioxide further acts to react with insoluble $CaCO_3$ precipitated as crystals to produce soluble $Ca(HCO_3)_2$, as described later. As a result, the turbidity of the treated water in the circulation flow path can be reduced. As described above, carbon dioxide has a function of reducing both the pH and turbidity of the treated water.

By continuously supplying carbon dioxide to the circulation flow path, even when the measurement value of the pH sensor 42 or the turbidity sensor 44 is detected as an abnormal value, it is possible to bring the measurement value close to a normal value while circulating the treated water.

When the measurement value returns to the normal value, the controller 13 controls of the valve 210 to allow the flow of water from the third flow path 38 to the water storage tank 48 and to stop the flow of water in the third return flow path 46. As a result, the flow of water is switched from the abnormality occurrence mode illustrated in FIG. 9 to the flow of the treated water supply mode illustrated in FIG. 4.

<Regeneration Treatment (Cleaning Treatment)>

The principle of the cleaning treatment of the flow path by carbon dioxide, that is, the "regeneration treatment" will be described in detail.

By performing the water softening treatment, part of $CaCO_3$ precipitated by crystallizing metal ions is attached to the inner wall surface of the flow path. As a process for returning this $CaCO_3$ to $Ca(HCO_3)_2$, a regeneration treatment is performed.

Figure 10:
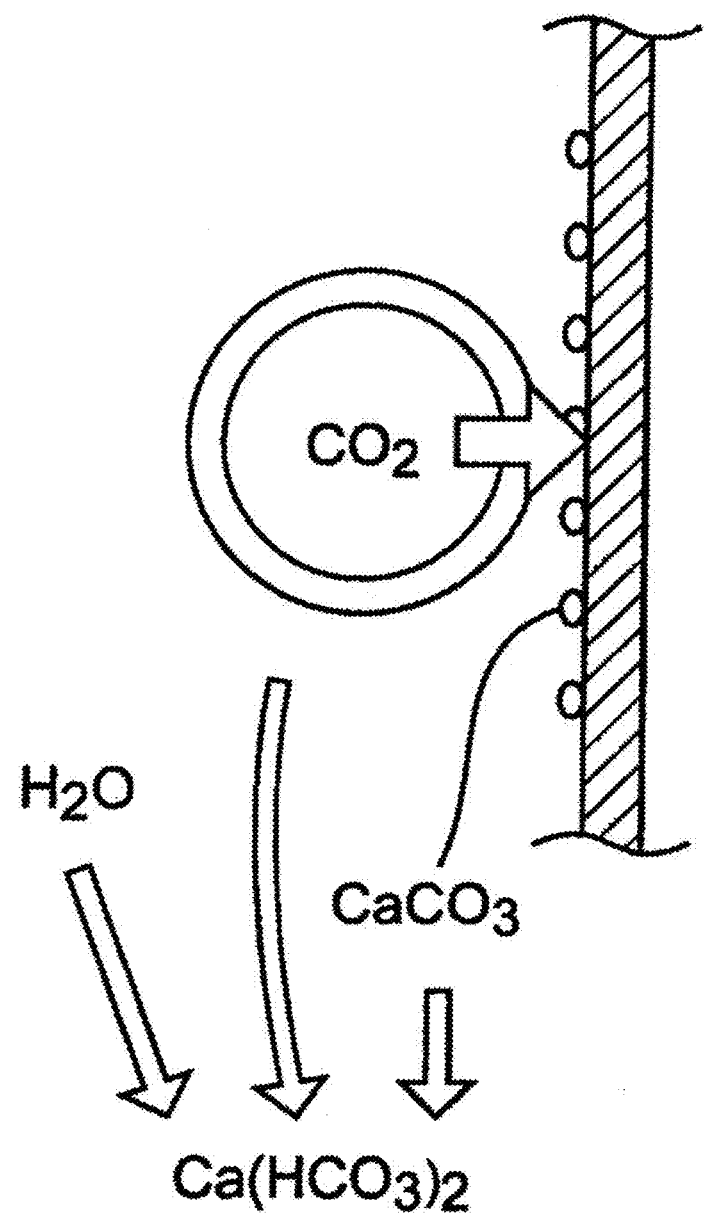
FIG. 10 is a schematic diagram for explaining a hypothetical principle of reproduction processing by the ion removal device.

As illustrated in FIG. 10, the following reaction is promoted by supplying carbon dioxide to $CaCO_3$ attached to the inner wall surface of the flow path.

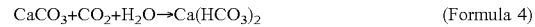

$$CaCO_3 + CO_2 + H_2O \rightarrow Ca(HCO_3)_2 \quad \text{(Formula 4)}$$

Soluble (water-soluble) $Ca(HCO_3)_2$ is generated from insoluble $CaCO_3$ by the reaction. $Ca(HCO_3)_2$ dissolves into water. As a result, insoluble $CaCO_3$ attached to the inner wall surface of the flow path can be discharged to the outside and returned to the original state.

Each of the valves 18, 30, 34, 47 of the first embodiment has a function of, in addition to a function of closing one flow path and opening another flow path, changing a flow-rate by adjusting an opening degree of opening the another flow path. That is, each of the valves 18, 30, 34, 47 functions as a "flow-rate adjustment valve".

According to such a flow-rate adjusting function, the valve 18 can vary the flow-rate of the hard water/treated water supplied from the batch treatment tank 6 to the electrolysis device 8, and similarly, can vary the flow-rate of the treated water supplied from the hard water flow path 4 to the branch flow path 36. The same applies to the valves 30, 34, 47.

In the mode illustrated in FIG. 3A, when alkaline water flows from the first flow path 22 to the first return flow path 26, the controller 13 adjusts the flow-rate by adjusting the opening degree of the valve 30. Similarly, when acid water flows from the second flow path 24 to second discharge flow path 32, the controller 13 adjusts the flow-rate by adjusting the opening degree of the valve 34. The same applies to the mode illustrated in FIG. 3B.

When the electrolysis device 8 is operated to generate alkaline water and acid water, the controller 13 of the first embodiment adjusts the opening degrees of the valves 30, 34 so as to reduce the flow-rate of the acid water. Specifically, when the acid water flows through the valve 30 as illustrated in FIG. 3B, the opening degree of the valve 30 is set to be smaller than that when the alkaline water flows through the valve as illustrated in FIG. 3A, and the flow-rate of the acid water is reduced. Similarly, when the acid water flows through the valve 34 as illustrated in FIG. 3A, the opening degree of the valve 34 is set to be smaller than that when the alkaline water flows through the valve as illustrated in FIG. 3B, and the flow-rate of the acid water is reduced. By reducing the flow-rate of acidic water in the first and second crystallization treatment modes as described above, the acidity of acidic water in each flow path can be increased. This makes it possible to enhance the effect of cleaning the flow path with acid water.

As described above, the ion removal system 2 of the first embodiment includes the electrolysis device 8, the first flow path 22 and the second flow path 24, the hard water flow path 4, and the fine bubble generation devices 10A and 10B. The first flow-rate adjustment valve 30 is connected to the first flow path 22, and the second flow-rate adjustment valve 34 is connected to the second flow path 24.

According to such configuration, by allowing the alkaline water and the acid water to alternately flow through the first flow path 22 and the second flow path 24, it is possible to allow the acid water to flow through after allowing the alkaline water to flow through each flow paths 22, 24, and it is possible to clean the flow paths 22, 24. As a result, each of the flow paths 22, 24 can be maintained in a state suitable for metal ion removal processing, and the effect of removing metal ions by fine bubbles can be enhanced. By adjusting the ratio of the flow-rates of alkaline water and acidic water with the flow-rate adjustment valves 30, 34, it is possible to control to further enhance the effect of removing metal ions such as increasing the acidity of acidic water.

The controller 13 of the first embodiment performs the first crystallization treatment mode in which alkaline water is allowed to flow through the first flow path 22 and acidic water is allowed to flow through the second flow path 24, and the second crystallization treatment mode in which acidic water is allowed to flow through the first flow path 22 and alkaline water is allowed to flow through the second flow path 24. The controller 13 sets the opening degree of the first flow-rate adjustment valve 30 so that the opening degree of the second crystallization treatment mode is smaller than that of the first crystallization treatment mode, and sets the opening degree of the second flow-rate adjustment valve 34 so that the opening degree of the first crystallization treatment mode is smaller than that of the second crystallization treatment mode.

According to such control, the acidity of the acidic water flowing through the first flow path 22 and the second flow path 24 can be increased, and the cleaning effect of the flow path can be enhanced.

Next, the detailed configuration of the electrolysis device 8 will be described with reference to FIGS. 11 to 18.

Figure 11:
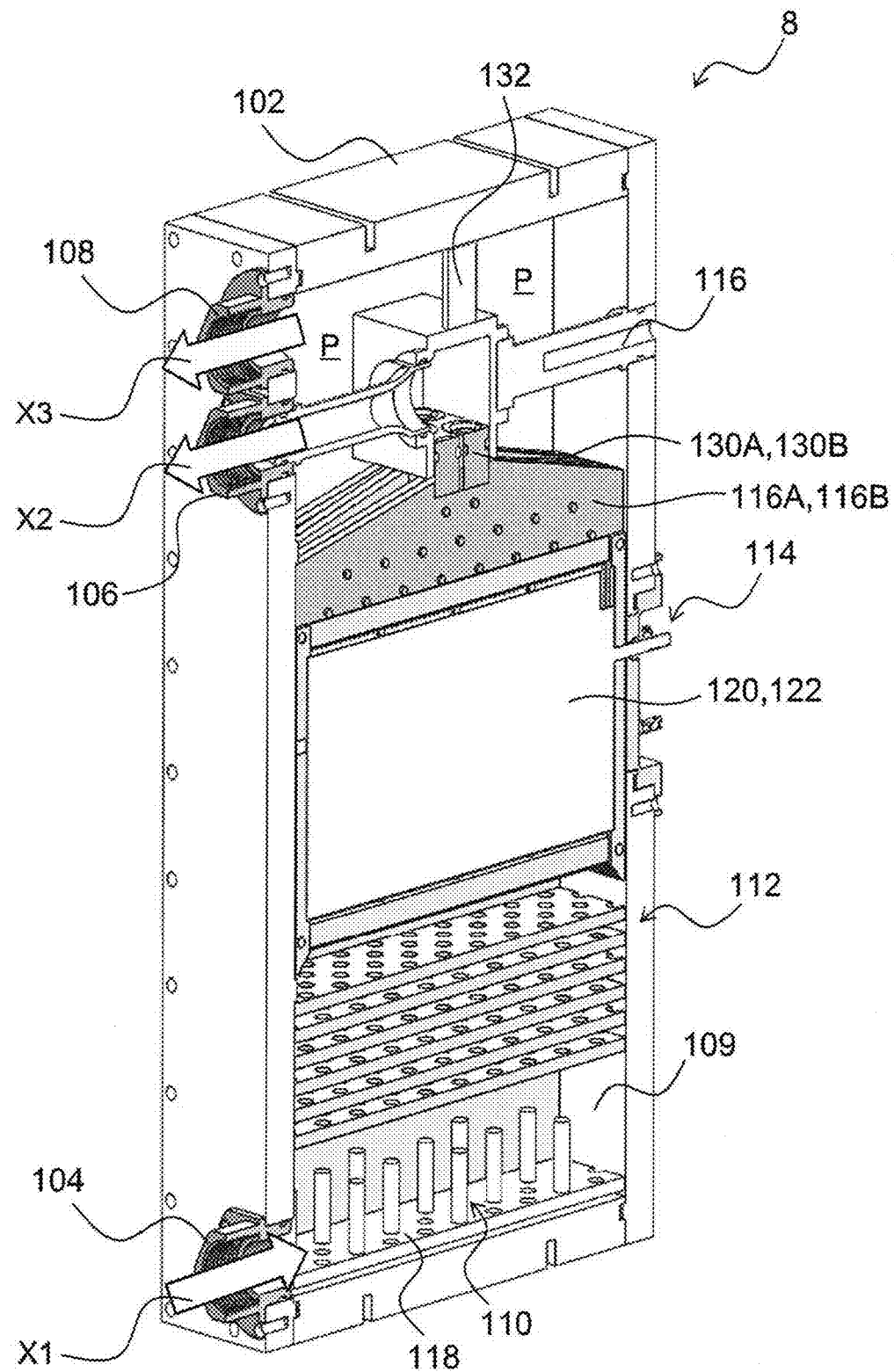
FIG. 11 is a notched perspective view of an electrolysis device in the first embodiment.

FIG. 11 is a notched perspective view illustrating a vertical cross section of the electrolysis device 8. The electrolysis device 8 illustrated in FIG. 11 includes a casing 102, an inlet port 104, a first outlet port 106, and a second outlet port 108.

The inlet port 104 is a port connected to the hard water flow path 4 described above. The first outlet port 106 is a port connected to the first flow path 22 described above. The second outlet port 108 is a port connected to the second flow path 24 described above.

The inlet port 104 and the outlet ports 106, 108 are both provided on the side surface of the casing 8. An inflow direction of the water flowing into the casing 102 from the inlet port 104 is defined as X1, and outflow directions of the water flowing out from the outlet ports 106, 108 to the outside of the casing 102 are defined as X2, X3. The inflow directions X1, X2, X3 are all lateral (horizontal).

As illustrated in FIG. 11, a common flow path 109 is provided at a position communicating with the inlet port 104. The common flow path 109 is a flow path provided at a position in contact with the bottom surface 118 inside the casing 102. The water flowing into the common flow path 109 from the inlet port 104 rises in the common flow path 109.

The electrolysis device 8 further includes first rectifying members 110, second rectifying members 112, an electrolysis unit 114, and a joint member 132.

The first rectifying members 110 and the second rectifying members 112 are members for rectifying the common flow path 109.

In the example illustrated in FIG. 11, the first rectifying members 110 are a plurality of rod-shaped members erected on the bottom surface 118 of the casing 102. The second rectifying members 112 are a plurality of plate-shaped members arranged above the first rectifying members 110. The second rectifying member 112 is configured by providing a plurality of plates each having a plurality of through holes at intervals above and below. Every plate constituting the second rectifying member 112 is a plate that has the same shape having through holes at the same positions, and the adjacent second rectifying members 112 are arranged so that front and back sides of one of the second rectifying members 112 are opposite from those of the other second rectifying member 112. According to such an arrangement, positions of the through holes can be different between the adjacent second rectifying members 112 with respect to the water rising in the common flow path 109, and the rectifying effect can be improved.

By rectifying the common flow path 109 in two stages by the first rectifying members 110 and the second rectifying members 112, the rectifying effect can be enhanced. As a result, a more uniform flow rate of water can be supplied to the electrolysis unit 114.

The electrolysis unit 114 is a unit that produces alkaline water and acidic water by electrolysis. Inside the electrolysis unit 114, two types of branch flow paths and two types of electrodes are provided. Alkaline water and acidic water are alternately generated in each branch flow path.

Next, the detailed configuration of the electrolysis unit 114 will be described with reference to FIGS. 12 to 18.

Figure 12:
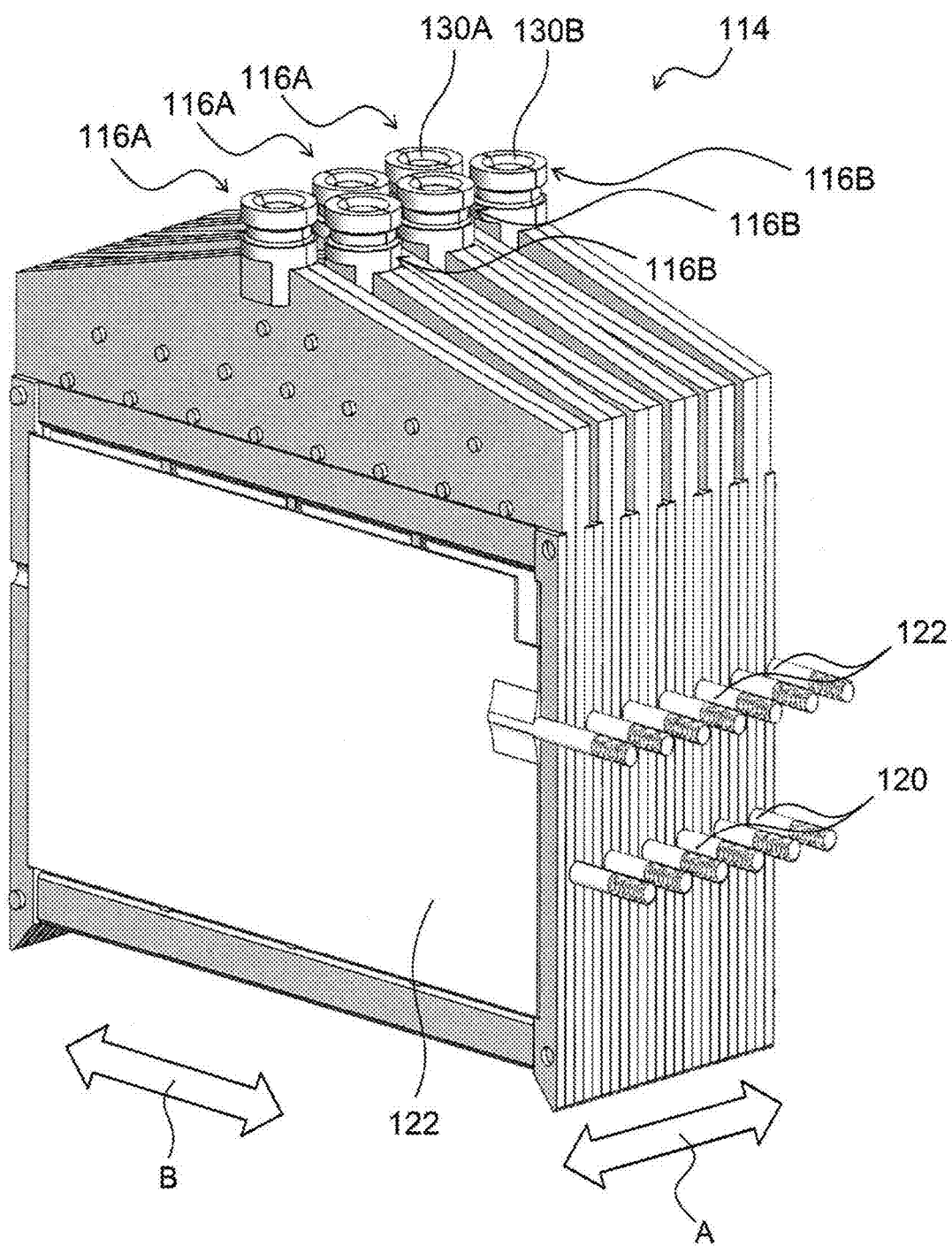
FIG. 12 is a perspective view of an electrolysis unit in the first embodiment.

FIG. 12 is a perspective view of the electrolysis unit 114. The electrolysis unit 114 illustrated in FIG. 12 includes a plurality of first electrolytic packs 116A and a plurality of second electrolytic packs 116B. The first electrolytic pack 116A and the second electrolytic pack 116B are arranged alternately along an A direction, which is the lateral direction.

As illustrated in FIG. 12, a first opening 130A of the first electrolytic pack 116A and a second opening 130B of the second electrolytic pack 116B are arranged to be offset from each other. Specifically, when the first opening 130A and the second opening 130B are viewed from the A direction, they are offset from each other in a B direction, which is the lateral direction intersecting the A direction. With such an arrangement, the first electrolytic pack 116A and the second electrolytic pack 116B can be arranged close to each other in the A direction, and can be arranged more closely.

Figure 13:
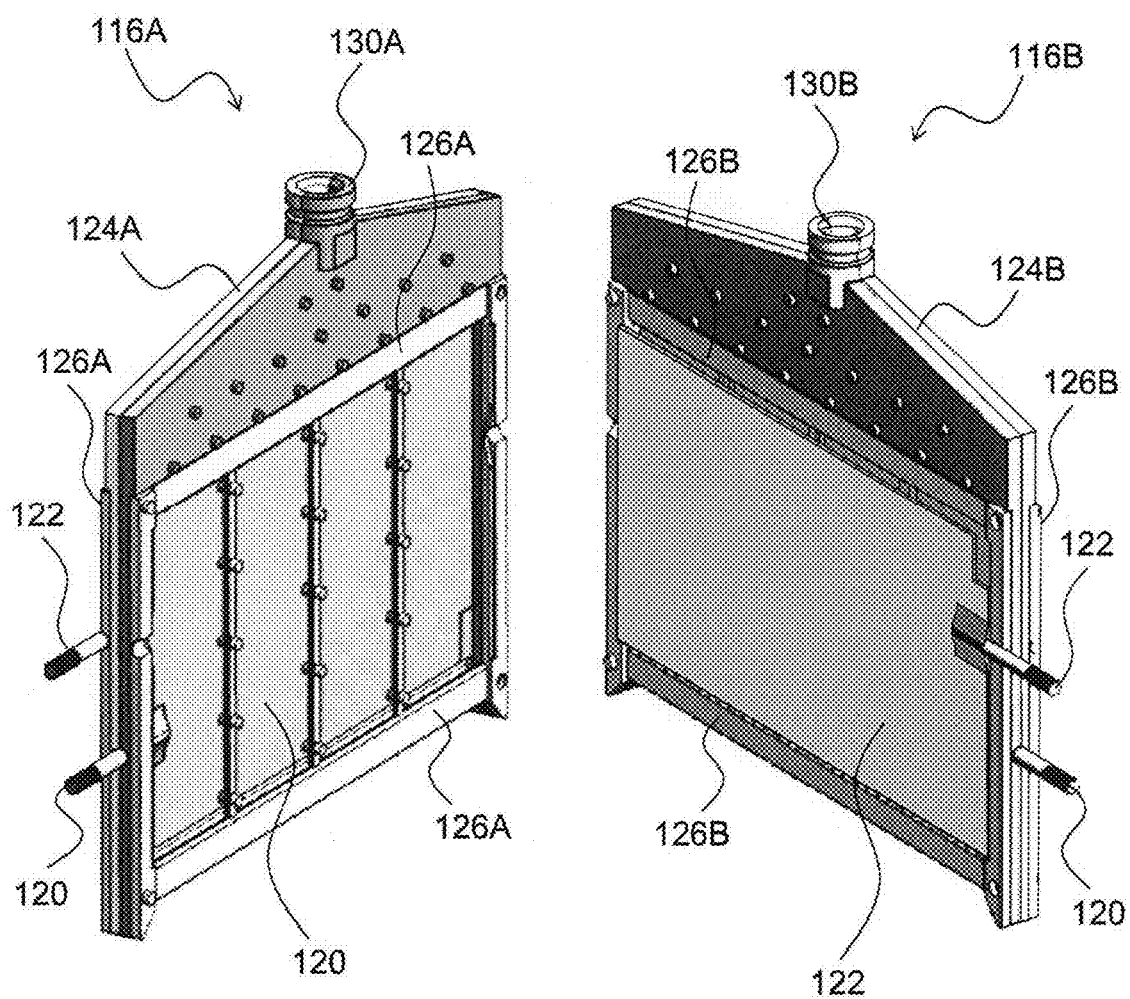
FIG. 13 is a perspective view of a first electrolytic pack and a second electrolytic pack in the first embodiment.
Figure 14:
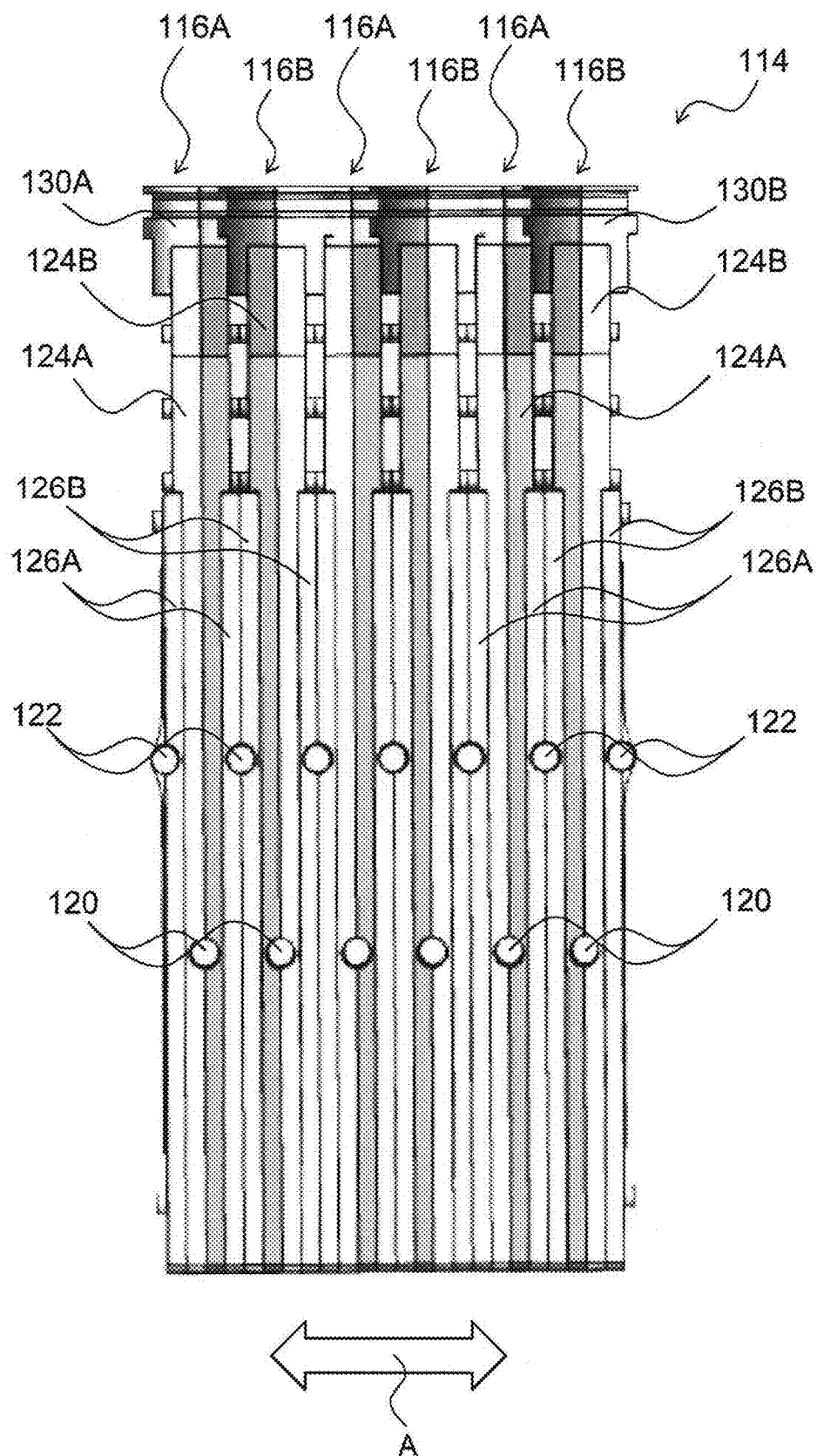
FIG. 14 is a side view of an electrolysis unit in the first embodiment.
Figure 15:
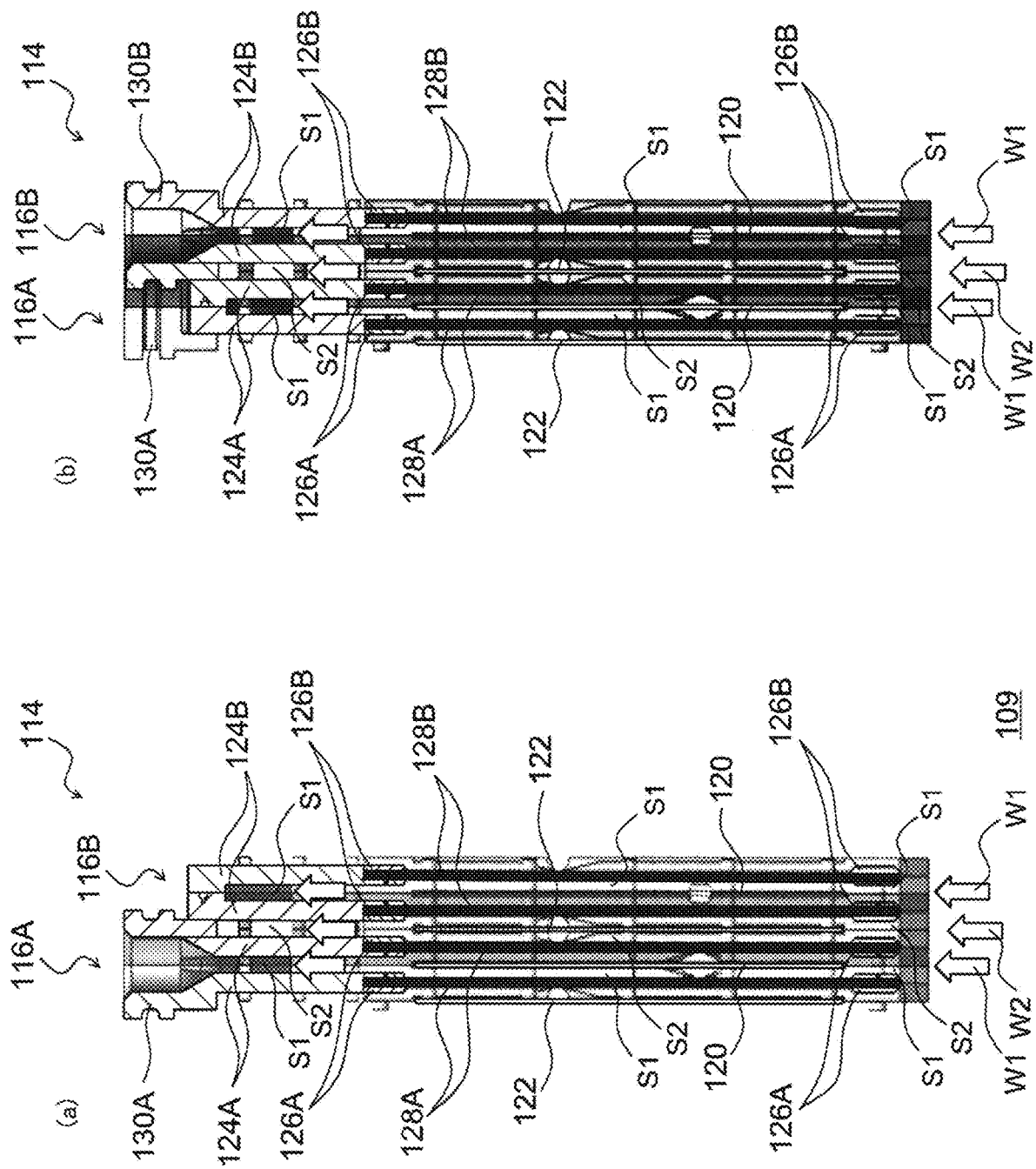
FIG. 15 is a cross-sectional view illustrating a branch flow path in the electrolysis unit in the first embodiment.

Next, a perspective view of the first electrolytic pack 116A and the second electrolytic pack 116B is illustrated in FIG. 13. A side view of the electrolysis unit 114 is illustrated in FIG. 14, and a cross-sectional view illustrating a branch flow path in the electrolysis unit 114 is illustrated in FIG. 15. In FIG. 15, (a) illustrates a cross section including the first opening 130A of the first electrolytic pack 116A, and (b) illustrates a cross section including the second opening 130B of the second electrolytic pack 116B.

As illustrated in FIG. 13, the first electrolytic pack 116A and the second electrolytic pack 116B contain the first electrode 120 and the second electrode 122, respectively.

The first electrolytic pack 116A includes a first flow path forming portion 124A, a first waterproof film fixing portion 126A, and the first opening 130A. Similarly, the second electrolytic pack 116B includes a second flow path forming portion 124B, a second waterproof film fixing portion 126B, and the second opening 130B.

Each of the first and second flow path forming portions 124A, 124B is a film that forms the flow path inside. Each of the first and second flow path forming portions 124A, 124B sandwiches the plate-shaped first electrode 120 inside. A plate-shaped second electrode 122 is sandwiched between the first flow path forming portion 124A and the second flow path forming portion 124B.

The first waterproof film fixing portion 126A is attached to both sides of the flow path forming portion 124A. The first waterproof film fixing portion 126A is a film for fixing a first moisture permeable waterproof film 128A (see FIG. 15 and not illustrated in FIG. 13) to the first flow path forming portion 124A. Similarly, a second waterproof film fixing portion 126B is attached to both sides of the flow path forming portion 124B. The second waterproof film fixing portion 126B is a film for fixing a second moisture permeable waterproof film 128B (see FIG. 15) to the second flow path forming portion 124B.

The first and second moisture permeable waterproof films 128A, 128B are moisture permeable waterproof films. The first and second moisture permeable waterproof films 128A, 128B and the first and second flow path forming portions 124A, 124B form the first branch flow path S1 and the second branch flow path S2.

The first branch flow path S1 is a space formed inside the first flow path forming portion 124A and the first moisture permeable waterproof film 128A. The first branch flow path S1 is also formed inside the second flow path forming portion 124B and the second moisture permeable waterproof film 128B. One first electrode 120 is arranged in one first branch flow path S1.

The second branch flow path S2 is a space formed between the first moisture permeable waterproof film 128A and the second moisture permeable waterproof film 128B, and between the first flow path forming portion 124A and the second flow path forming portion 124B. One second electrode 122 is arranged in one second branch flow path S2.

The water flowing into the electrolysis unit 114 from the common flow path 109 is divided into water W1 flowing into the first branch flow path S1 and water W2 flowing into the second branch flow path S2.

The water W1 flowing into the first branch flow path S1 rises in the first branch flow path S1 along the first electrode 120 arranged in the first branch flow path S1, and then released from the first opening 130A or the second opening 130B to the downstream side. The water W2 flowing into the second branch flow path S2 rises in the second branch flow path S2 along the second electrode 122 arranged in the second branch flow path S2, and then released from a space between the opening 130A and the opening 130B to the downstream.

Returning to FIG. 11, the first and second openings 130A and 130B of the electrolysis unit 114 are connected to the joint member 132. The joint member 132 collectively connects the plurality of first openings 130A and the plurality of second openings 130B to the first outlet port 106. The water W1 flowing from the first branch flow path S1 to the first opening 130A and the second opening 130B by the joint member 132 is guided to the first outlet port 106.

A space P is formed on the outside of the joint member 132. The space P communicates with a plurality of second branch flow paths S2 in the electrolysis unit 114. The space P also communicates with the second outlet port 108, and the water W2 flowing from the second branch flow path S2 to the space P is guided to the second outlet port 108.

The above-described electrolysis device 8 is electrically connected to the controller 13 (FIG. 1 and the like). The controller 13 performs a voltage application mode in which a voltage is applied to the first electrode 120 and the second electrode 122. The controller 13 of the first embodiment performs a first voltage application mode in which a voltage is applied using one of the first electrode 120 and the second electrode 122 as an anode and the other as a cathode, and a second voltage application mode in which a voltage is applied using one of the first electrode 120 and the second electrode 122 as a cathode and the other as an anode.

In the first voltage application mode, the water W1 flowing through the first branch flow path S1 illustrated in FIG. 15 is generated as alkaline water, and the water W2 flowing through the second branch flow path S2 is generated as acidic water. The generated alkaline water flows to the first outlet port 106 via the joint member 132, and is allowed to flow through the first flow path 22 connected to the first outlet port 106. The acidic water flows to the second outlet port 108 through the space P outside the joint member 132, and is allowed to flow through the second flow path 24 connected to the second outlet port 108.

The first voltage application mode described above is a mode in which alkaline water is allowed to flow through the first flow path 22 and acidic water is allowed to flow through the second flow path 24, and corresponds to the first crystallization treatment mode illustrated in FIG. 3A.

On the other hand, in the second voltage application mode, the water W2 flowing through the second branch flow path S2 illustrated in FIG. 15 is generated as alkaline water, and the water W1 flowing through the first branch flow path S1 is generated as acidic water. The alkaline water flows to the second outlet port 108 through the space P outside the joint member 132, and is allowed to flow through the second flow path 24. On the other hand, the acidic water flows to the first outlet port 106 via the joint member 132 and is allowed to flow through the first flow path 22.

The second voltage application mode described above is a mode in which alkaline water is allowed to flow through the second flow path 24 and acidic water is allowed to flow through the first flow path 22, and corresponds to the second crystallization treatment mode illustrated in FIG. 3B.

In the mode described above, the first and second flow path forming portions 124A, 124B, the first and second waterproof film fixing portions 126A, 126B and the first and second moisture permeable waterproof films 128A, 128B illustrated in FIG. 15 function as "partition walls" that partition the first electrode 120 and the second electrode 122 with each other.

As illustrated in FIG. 11, the plate-shaped first and second electrodes 120, 122 are arranged so that their respective main surfaces extend in the vertical direction. As a result, the main surfaces of the plate-shaped electrodes 120 and 122 are arranged so as to extend along the inflow direction X1 in a plan view. According to such an arrangement, a state is changed from a state where there is a distribution that the flow-rate of water is larger in the back side than in the front side in the inflow direction X1 inside the casing 102 to a state where the same flow-rate is generated in both electrodes 120, 122. As a result, the flow-rate of water flowing along the electrodes 120, 122 can be made uniform.

As described above, the electrolysis device 8 of the first embodiment includes the inlet port 104, the first outlet port 106, the second outlet port 108, the common flow path 109, the first branch flow path S1, the second branch flow path S2, the first electrode 120, and the second electrode 122. The electrolysis device 8 of the first embodiment further includes, as a partition wall that partitions the first branch flow path S1 and the second branch flow path S2, the first and second flow path forming portions 124A, 124B, the first and second waterproof film fixing portions 126A, 126B, and the first and second moisture permeable waterproof films 128A, 128B.

According to such a configuration, by connecting two branch flow paths S1, S2 on the downstream side of the common flow path 109, the point where the differential pressure between alkaline water and acidic water is generated can be immediately before the branch flow paths S1, S2. The differential pressure between alkaline water and acidic water generated in the branch flow paths S1, S2 can be reduced as compared with a case where the differential pressure starts to be generated on the upstream side. As a result, the alkaline water and acidic water partitioned by the first and second moisture permeable waterproof films 128A, 128B are prevented from being mistakenly permeated through the first and second moisture permeable waterproof films 128A, 128B due to the differential pressure and mixed with each other. As a result, it is possible to suppress a decrease in the capacity of the electrolysis device 8. By reducing the differential pressure, it is possible to prevent the first and second flow path forming portions 124A, 124B and the electrodes 120, 122, which are partition walls, from being deformed and damaged when the electrolysis device 8 is repeatedly operated.

According to the electrolysis device 8 of the first embodiment, the first and second flow path forming portions 124A, 124B and the first and second moisture permeable waterproof films 128A, 128B, which are partition walls, are divided into two forks so as to sandwich both sides of the plate-shaped first electrode 120 to form the first branch flow path S1 in the inside. The partition wall further forms openings 130A, 130B that open the first branch flow path S1 to the downstream side. A plurality of partition walls containing the first electrode 120 are arranged side by side in the lateral A direction so as to form the second branch flow path S2 while the plate-shaped second electrode 122 is arranged between the partition walls.

According to such a configuration, the first branch flow path S1 and the second branch flow path S2 can be formed while separating the first electrode 120 and the second electrode 122 by the partition wall.

Next, the ribs 134, 136, 138, 140 provided in the electrolysis unit 114 will be described with reference to FIGS. 16 to 18.

Figure 16:
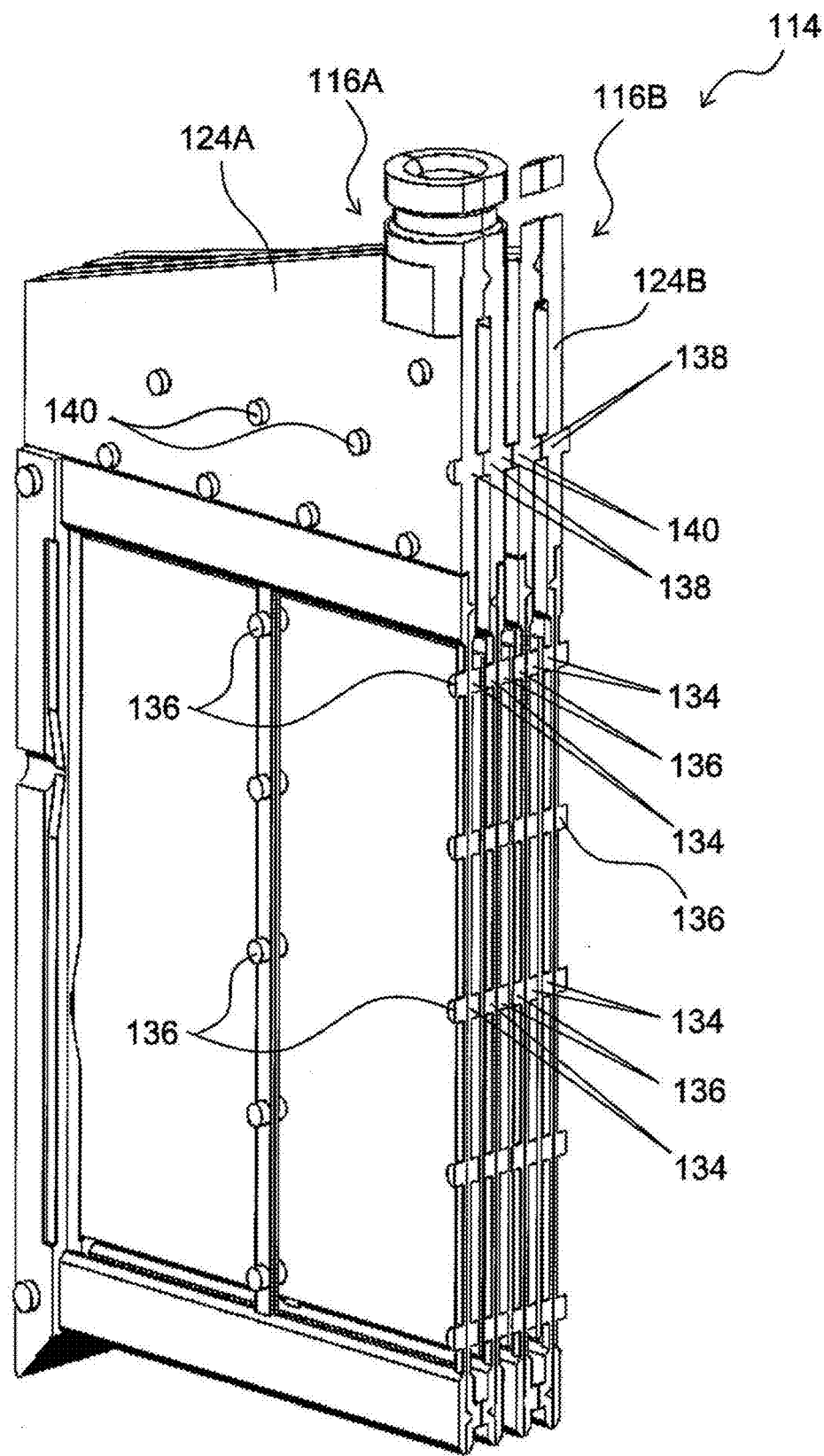
FIG. 16 is a notched perspective view illustrating a vertical cross section of the electrolysis unit in the first embodiment.

FIG. 16 is a notched perspective view illustrating a vertical cross section of the electrolysis unit 114. FIGS. 17 and 18 are partially enlarged perspective views of FIG. 16. In FIGS. 16 to 18, the first and second moisture permeable waterproof films 128A, 128B illustrated in FIG. 15 are not illustrated.

As illustrated in FIG. 16, each of the electrolytic packs 116A, 116B includes a first rib 134 and a second rib 136.

The first rib 134 is a protrusion protruding inward in each of the electrolytic packs 116A, 116B. The second rib 136 is a protrusion protruding outward in each of the electrolytic packs 116A, 116B.

Figure 17:
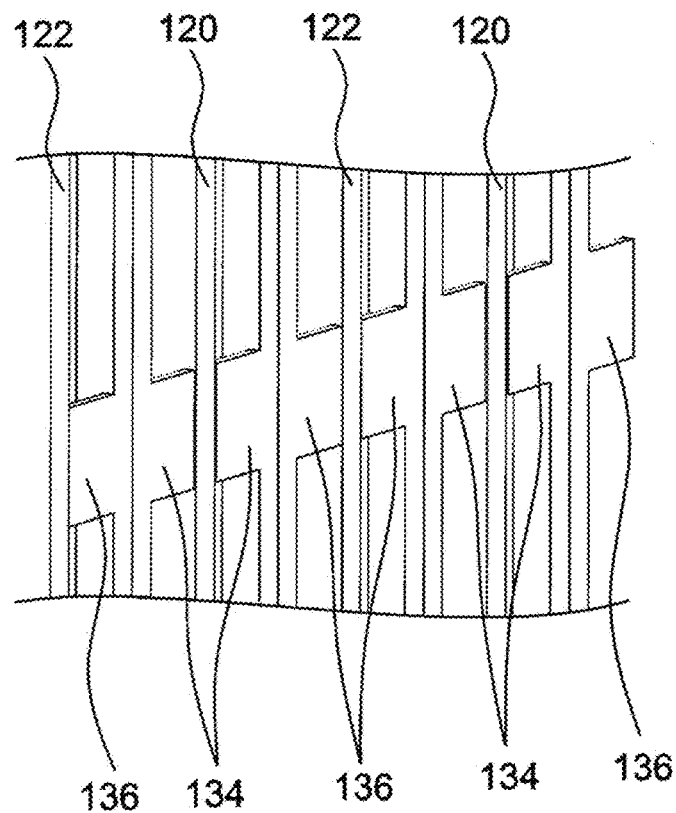
FIG. 17 is a partially enlarged perspective view of FIG. 16.

As illustrated in FIG. 17, the first rib 134 contacts both main surfaces of the first electrode 120 so as to sandwich the plate-shaped first electrode 120. The first electrode 120 is positioned by the first rib 134. The second rib 136 contacts both main surfaces of the second electrode 122 so as to sandwich the plate-shaped second electrode 122. The second electrode 122 is positioned by the second rib 136.

By providing the first rib 134 and the second rib 136 described above, the first and second electrodes 120, 122 can be positioned while not blocking the first branch flow path S1 and the second branch flow path S2.

Returning to FIG. 16, each of the electrolytic packs 116A, 116B includes a third rib 138 and a fourth rib 140.

The third rib 138 and the fourth rib 140 are protrusions provided at positions where they do not come into contact with the electrodes 120, 122. The third rib 138 protrudes inward in each of the electrolytic packs 116A, 116B, and the fourth rib 140 protrudes outward in each of the electrolytic packs 116A, 116B.

Figure 18:
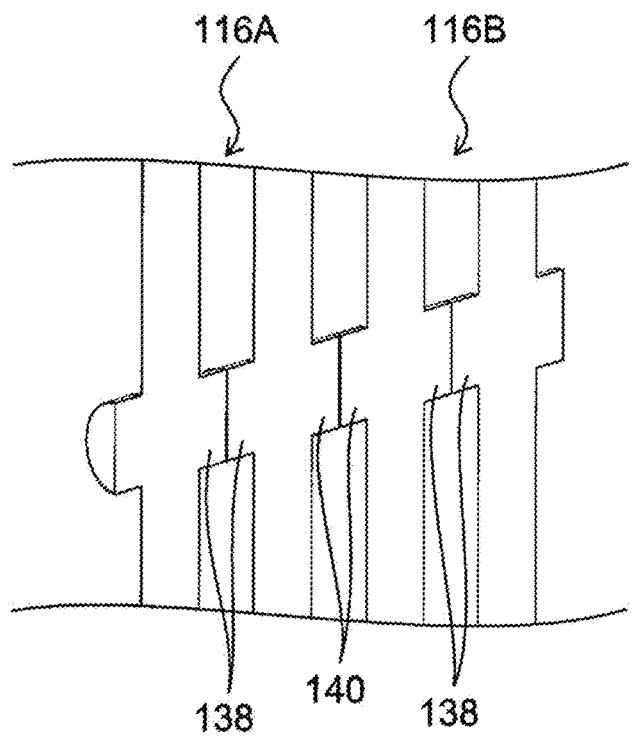
FIG. 18 is a partially enlarged perspective view of FIG. 16.

As illustrated in FIG. 18, the two third ribs 138 facing each other are in direct contact with each other without the electrodes 120, 122. Similarly, the two fourth ribs 140 facing each other are in direct contact with each other without the electrodes 120, 122. By providing such third and fourth ribs 138, 140 as ribs of a type different from the first and second ribs 134, 136, deformation of the partition wall can be effectively suppressed.

The ribs 134, 136, 138, 140 described above are all formed in a columnar shape. As illustrated in FIG. 16, by interspersing the ribs 134, 136, 138, 140, the electrodes 120, 122 can be positioned while suppressing an increase in the flow path resistance of the first and second branch flow paths S1, S2, and deformation of the partition wall can be suppressed.

As illustrated in FIG. 16, the first ribs 134 are provided at the same positions on front and back in the two forks, and the second ribs 136 are provided at the same positions on front and back in the two forks. Similarly, the third ribs 138 are provided at the same positions on front and back in the two forks, and the forth ribs 140 are provided at the same positions on front and back in the two forks. With such an arrangement, deformation of the partition wall can be effectively suppressed.

As illustrated in FIG. 16, the first rib 134 and the second rib 136 are regularly arranged at intervals in the vertical direction. On the other hand, the third rib 138 and the fourth rib 140 are arranged in a staggered pattern. By making the arrangement patterns of the first rib 134 and the second rib 136 different from the arrangement patterns of the third rib 138 and the fourth rib 140 in this way, it is possible to take an appropriate arrangement pattern according to each position.

The present invention is not limited to the above embodiment, and can be implemented in various other aspects. For example, in the first embodiment, the fine bubble generation devices 10A and 10B automatically generate fine bubbles into water flowing through the fine bubble generation devices 10A and 10B, but the present invention is not limited to such a case. The fine bubble generation devices 10A and 10B may be electrically operated, and the fine bubbles may be supplied only when the controller 13 drives the fine bubble generation devices 10A and 10B.

By appropriately combining the various aspects described above, the effects of the aspects can be achieved.

Although the present invention has been fully described in connection with preferred embodiments with reference to the accompanying drawings, various changes and modifications will be apparent to those skilled in the art. Such changes and modifications are to be understood as being included within the scope of the present invention as set forth in the appended claims. Combinations of elements and changes in order in the embodiments can be achieved without departing from the scope and spirit of the present invention.

INDUSTRIAL APPLICABILITY

The present invention is useful for both an ion removal system for home use and an ion removal system for business use.

DESCRIPTION OF REFERENCE NUMERALS

2 Ion removal system
4 Hard water flow path
6 Batch treatment tank
8 Electrolysis device
10A, 10B Fine bubble generation device
11 Valve
12 Separation device
13 Controller
14 Pump
16 Flow-rate sensor
18 Valve (flow-rate adjustment valve)
22 First flow path
24 Second flow path
26 First return flow path
28 First discharge flow path
30 Valve (flow-rate adjustment valve)
31 Second return flow path
32 Second discharge flow path
34 Valve (flow-rate adjustment valve)
36 Branch flow path
38 Third flow path
40 Third discharge flow path
42 pH sensor
44 Turbidity sensor
46 Third return flow path
47 Valve (flow-rate adjustment valve)
48 Water storage tank
50 Pump
52 Water faucet
102 Casing
104 Inlet port
106 First outlet port
108 Second outlet port
110 First rectifying members
112 Second rectifying members
114 Electrolysis unit
116A First electrolytic pack
116B Second electrolytic pack
118 Bottom surface
120 First electrode
122 Second electrode
124A First flow path forming portion (partition wall)
124B Second flow path forming portion (partition wall)
126A First waterproof film fixing portion (partition wall)
126B Second waterproof film fixing portion (partition wall)
128A First moisture permeable waterproof film (partition wall)
128B Second moisture permeable waterproof film (partition wall)
130A First opening
130B Second opening
132 Joint member
134 First rib
136 Second rib
138 Third rib
140 Fourth rib
202A, 202B Debubbling device
212 Carbon dioxide input device
S1 First branch flow path
S2 Second branch flow path
W1, W2 Water

The invention claimed is:

1. An ion removal system comprising:
an electrolysis device configured to generate alkaline water and acidic water by electrolysis;
a first flow path and a second flow path through which the alkaline water and the acidic water generated by the electrolysis device are alternately allowed to flow;
a hard water flow path connected to the electrolysis device to supply the electrolysis device with hard water; and
a fine bubble generation device configured to generate fine bubbles in a flow path upstream or downstream of the electrolysis device,
wherein a first flow-rate adjustment valve is connected to the first flow path, and a second flow-rate adjustment valve is connected to the second flow path, and
further comprising a controller, wherein
the controller controls the electrolysis device to perform a first mode of allowing the alkaline water to flow through the first flow path and allowing the acidic water to flow through the second flow path, and a second mode of allowing the acidic water to flow through the first flow path and allowing the alkaline water to flow through the second flow path, and
an opening degree of the first flow-rate adjustment valve is set to be smaller in the second mode than in the first mode, and an opening degree of the second flow-rate adjustment valve is set to be smaller in the first mode than in the second mode.

2. The ion removal system according to claim 1, wherein the electrolysis device includes:
an inlet port to which the hard water flow path is connected;
a first outlet port to which the first flow path is connected;
a second outlet port to which the second flow path is connected;
a common flow path communicating with the inlet port;
a first branch flow path connected downstream to the common flow path and communicating with the first outlet port;
a second branch flow path connected downstream to the common flow path and communicating with the second outlet port;
a partition wall partitioning the first branch flow path and the second branch flow path;
a first electrode disposed in the first branch flow path; and
a second electrode disposed in the second branch flow path.

3. The ion removal system according to claim 2, wherein the partition wall is divided into two forks to sandwich both sides of the first electrode having a plate shape so that the first branch flow path is provided inside the partition wall, and has an opening to release the first branch flow path downstream thereof, and
a plurality of the partition walls containing the first electrode are arranged side by side in a lateral direction to make the second branch flow path while the second electrode having a plate shape is arranged between the plurality of the partition walls.

4. An ion removal system comprising:
an electrolysis device configured to generate alkaline water and acidic water by electrolysis;
a first flow path and a second flow path through which the alkaline water and the acidic water generated by the electrolysis device are alternately allowed to flow;
a hard water flow path connected to the electrolysis device to supply the electrolysis device with hard water; and
a fine bubble generation device configured to generate fine bubbles in a flow path upstream or downstream of the electrolysis device,
wherein a first flow-rate adjustment valve is connected to the first flow path, and a second flow-rate adjustment valve is connected to the second flow path
wherein the electrolysis device includes:
  an inlet port to which the hard water flow path is connected;
  a first outlet port to which the first flow path is connected;
  a second outlet port to which the second flow path is connected;
  a common flow path communicating with the inlet port;
  a first branch flow path connected downstream to the common flow path and communicating with the first outlet port;
  a second branch flow path connected downstream to the common flow path and communicating with the second outlet port;
  a partition wall partitioning the first branch flow path and the second branch flow path;
  a first electrode disposed in the first branch flow path; and
  a second electrode disposed in the second branch flow path,
wherein
the partition wall is divided into two forks to sandwich both sides of the first electrode having a plate shape so that the first branch flow path is provided inside the partition wall, and has an opening to release the first branch flow path downstream thereof, and
a plurality of the partition walls containing the first electrode are arranged side by side in a lateral direction to make the second branch flow path while the second electrode having a plate shape is arranged between the plurality of the partition walls,
wherein each of the partition walls includes a plurality of first ribs protruding inward to contact the both sides of the first electrode, and a plurality of second ribs protruding outward to contact both sides of the second electrode.

5. The ion removal system according to claim 4, wherein the first ribs are provided on front and back at identical positions in the two forks of the partition wall and the second ribs are provided on front and back at identical positions in the two forks of the partition wall.

6. The ion removal system according to claim 4, wherein each of the partition walls further includes a plurality of third ribs protruding inward to be in direct contact with each other without the first electrode, and a plurality of fourth ribs protruding outward, and,
in two of the partition walls that are adjacent to each other, the fourth ribs are in direct contact with each other without the second electrode.

7. The ion removal system according to claim 6, wherein an arrangement pattern of the first ribs and the second ribs is different from an arrangement pattern of the third ribs and the fourth ribs, respectively.

8. An ion removal system comprising:
an electrolysis device configured to generate alkaline water and acidic water by electrolysis;
a first flow path and a second flow path through which the alkaline water and the acidic water generated by the electrolysis device are alternately allowed to flow;
a hard water flow path connected to the electrolysis device to supply the electrolysis device with hard water; and
a fine bubble generation device configured to generate fine bubbles in a flow path upstream or downstream of the electrolysis device,
wherein a first flow-rate adjustment valve is connected to the first flow path, and a second flow-rate adjustment valve is connected to the second flow path
wherein the electrolysis device includes:
  an inlet port to which the hard water flow path is connected;
  a first outlet port to which the first flow path is connected;
  a second outlet port to which the second flow path is connected;
  a common flow path communicating with the inlet port;
  a first branch flow path connected downstream to the common flow path and communicating with the first outlet port;
  a second branch flow path connected downstream to the common flow path and communicating with the second outlet port;
  a partition wall partitioning the first branch flow path and the second branch flow path;
  a first electrode disposed in the first branch flow path; and
  a second electrode disposed in the second branch flow path,
wherein
the partition wall is divided into two forks to sandwich both sides of the first electrode having a plate shape so that the first branch flow path is provided inside the partition wall, and has an opening to release the first branch flow path downstream thereof, and
a plurality of the partition walls containing the first electrode are arranged side by side in a lateral direction to make the second branch flow path while the second electrode having a plate shape is arranged between the plurality of the partition walls,
wherein
an inflow direction from the inlet port to the common flow path is a lateral direction, and
a main surface of the first electrode and a main surface of the second electrode each extend along the inflow direction in a plan view.

9. The ion removal system according to claim 3, wherein, in view along a direction in which the plurality of the partition walls are arrayed, the openings in two of the partition walls that are adjacent to each other are arranged to offset from each other.

10. The ion removal system according to claim 3, further comprising a joint member for causing the openings in the plurality of the partition walls to collectively communicate with the first outlet port, wherein
in a space outside the joint member, the second branch flow path in the plurality of the partition walls communicates with the second outlet port.

11. The ion removal system according to claim 2, wherein the electrolysis device includes rectifying members in the common flow path.

12. The ion removal system according to claim 11, wherein
- the common flow path is in contact with a bottom surface inside the electrolysis device, and the first branch flow path and the second branch flow path are above the common flow path, and
- the rectifying members include first rectifying members provided on the bottom surface of the electrolysis device and second rectifying members provided away from the bottom surface of the electrolysis device.

13. The ion removal system according to claim 12, wherein
- the first rectifying members are a plurality of rod-shaped members standing on the bottom surface of the electrolysis device, and
- the second rectifying members are a plurality of plate-shaped members each having a plurality of through holes and arranged to face with each other.

14. The ion removal system according to claim 13, wherein each of the plurality of plate-shaped members included in the second rectifying members has an identical shape with through holes at identical positions and adjacent plates of the plates are reversed from each other.

* * * * *